US009566880B2

(12) United States Patent
Yamaguchi et al.

(10) Patent No.: US 9,566,880 B2
(45) Date of Patent: Feb. 14, 2017

(54) VEHICLE SEAT

(71) Applicant: TOYOTA BOSHOKU KABUSHIKI KAISHA, Aichi-ken (JP)

(72) Inventors: Takao Yamaguchi, Aichi-ken (JP); Yoshiyuki Kumazaki, Aichi-ken (JP); Shinya Nagasaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 183 days.

(21) Appl. No.: 14/041,127

(22) Filed: Sep. 30, 2013

(65) Prior Publication Data
US 2014/0110986 A1 Apr. 24, 2014

(30) Foreign Application Priority Data
Oct. 23, 2012 (JP) .................................. 2012-233923

(51) Int. Cl.
*B60N 2/12* (2006.01)
*A47C 1/027* (2006.01)
(Continued)

(52) U.S. Cl.
CPC ............... *B60N 2/12* (2013.01); *A47C 1/027* (2013.01); *B60N 2/2893* (2013.01); *B60N 2/68* (2013.01);
(Continued)

(58) Field of Classification Search
CPC ............. B60N 2/20; B60N 2/206; B60N 2/22; B60N 2/234; B60N 2/2352; B60N 2/2356; B60N 2/236; B60N 2/2362; B60N 2/3011; B60N 2/3013; B60N 2/68; B60N 2/686; A47C 1/024; A47C 1/026; A47C 1/027
See application file for complete search history.

(56) References Cited

U.S. PATENT DOCUMENTS 3,727,978 A * 4/1973 Barriere et al. ............... 297/369
5,466,046 A * 11/1995 Komorowski ....... A47C 1/0345
297/325
(Continued)

FOREIGN PATENT DOCUMENTS

JP   2008-239075   10/2008
JP   2009-214573   9/2009
(Continued)

OTHER PUBLICATIONS

U.S. Appl. No. 14/048,506 to Takao Yamaguchi et al., filed Oct. 8, 2013.

(Continued)

*Primary Examiner* — David E Allred
(74) *Attorney, Agent, or Firm* — Greenblum & Bernstein, P.L.C.

(57) ABSTRACT

A vehicle seat includes a stopping structure that stops forward tilting rotation of a seatback between the seatback and a base on a floor. The stopping structure includes a stopping portion provided on one of the seatback or the base, and a stopper that is provided in a state supported in a cantilevered manner on the other of the seatback or the base, and that extends to a position overlapping with the stopping portion in a seat width direction. The stopping structure is configured to stop the forward tilting rotation of the seatback by abutment of the stopping portion and the stopper. A deformation inhibiting member that minimizes deformation in the seat width direction from the stopper abutting against the stopping portion following forward tilting rotation of the seatback, is provided on the other of the seatback or the base.

9 Claims, 19 Drawing Sheets

(51) Int. Cl.
- *B60N 2/68* (2006.01)
- *B60N 2/28* (2006.01)
- *B60N 2/22* (2006.01)
- *B60N 2/235* (2006.01)
- *B60N 2/20* (2006.01)
- *B60N 2/30* (2006.01)
- *A61G 5/10* (2006.01)
- *A47C 1/024* (2006.01)
- *A47C 1/026* (2006.01)

(52) U.S. Cl.
CPC ............ *A47C 1/024* (2013.01); *A47C 1/026* (2013.01); *A61G 5/1067* (2013.01); *B60N 2/20* (2013.01); *B60N 2/206* (2013.01); *B60N 2/22* (2013.01); *B60N 2/235* (2013.01); *B60N 2/236* (2015.04); *B60N 2/2352* (2013.01); *B60N 2/2356* (2013.01); *B60N 2/2362* (2015.04); *B60N 2/3011* (2013.01); *B60N 2/3013* (2013.01)

(56) References Cited

U.S. PATENT DOCUMENTS

| | | | | |
|---|---|---|---|---|
| 6,113,190 | A * | 9/2000 | Negi et al. | 297/378.1 |
| 8,376,459 | B2 * | 2/2013 | Kumazaki et al. | 297/341 |
| 8,641,146 | B2 * | 2/2014 | Suzuki | B60N 2/2362 297/367 P |
| 8,985,691 | B2 * | 3/2015 | Tsuruta et al. | 297/378.12 |
| 9,010,862 | B2 * | 4/2015 | Yamaguchi et al. | 297/367 R |
| 2007/0102982 | A1 * | 5/2007 | Yamada et al. | 297/367 |
| 2009/0066138 | A1 * | 3/2009 | Reubeuze et al. | 297/367 |
| 2010/0078972 | A1 * | 4/2010 | Sayama | B60N 2/3011 297/61 |
| 2010/0207440 | A1 * | 8/2010 | Hayakawa et al. | 297/378.14 |
| 2014/0110985 | A1 * | 4/2014 | Yamaguchi | B60N 2/68 297/354.1 |
| 2014/0125106 | A1 * | 5/2014 | Furukawa et al. | 297/378.1 |
| 2014/0284983 | A1 * | 9/2014 | Yamada | B60N 2/235 297/362 |
| 2015/0306985 | A1 * | 10/2015 | Kimura | B60N 2/12 297/354.12 |

FOREIGN PATENT DOCUMENTS

| | | |
|---|---|---|
| JP | 2010-52529 | 3/2010 |
| JP | 2010-052530 | 3/2010 |
| JP | 2010-221935 | 10/2010 |
| JP | 2011-116303 | 6/2011 |

OTHER PUBLICATIONS

Official Action, including partial English-language translation thereof, for JP 2012-233923 having a mailing date of Nov. 27, 2015.

\* cited by examiner

VEHICLE SEAT

INCORPORATION BY REFERENCE

The disclosure of Japanese Patent Application No. 2012-233923 filed on Oct. 23, 2012 including the specification, drawings and abstract is incorporated herein by reference in its entirety.

BACKGROUND OF THE INVENTION

1. Field of the Invention

The invention relates to a vehicle seat. More particularly, the invention relates to a vehicle seat provided with a stopping structure that stops forward tilting rotation of a seatback between the seatback and a base on a floor.

2. Description of Related Art

Japanese Patent Application Publication No. 2010-52530 (JP 2010-52530 A), for example, describes a vehicle seat that has a walk-in function that increases the space for a person to get into and out of a back seat by switching a seatback to a forward tilting position. Forward tilting rotation of the seatback is able to be stopped by a stopping portion provided on a side frame of the seatback abutting against a stopper pin provided on a side frame of a seat cushion. The stopper pin is attached to a tip end of a rotating link that is pivotally connected to the side frame of the seat cushion. When the stopping portion abuts against the stopper pin, the stopper pin is received by another stopper link that is pivotally connected to the side frame of the seat cushion, thus stopping forward tilting rotation of the seatback.

SUMMARY OF THE INVENTION

However, with a structure in which a heavy object such as a seatback is pushed against the stopper link, as is the case with the related art, the load applied to the stopper link is large, and the stopper link is easily pushed and bent in a seat width direction with a connecting portion where the stopper link is connected to the side frame as the fulcrum, and thus may not be able to stably stop the seatback in a predetermined position. The invention increases the strength of a stopping structure that stops the seatback in a predetermined forward tilting position.

A first aspect of the invention relates to a vehicle seat that includes a stopping structure that stops forward tilting rotation of a seatback between the seatback and a base on a floor. The stopping structure includes a stopping portion provided on one of the seatback or the base, and a stopper that is provided in a state supported in a cantilevered manner on the other of the seatback or the base, and that extends to a position overlapping with the stopping portion in a seat width direction. The stopping structure is configured to stop the forward tilting rotation of the seatback by abutment of the stopping portion and the stopper. Further, a deformation inhibiting member that minimizes deformation in the seat width direction from the stopper abutting against the stopping portion following forward tilting rotation of the seatback, is provided on the other of the seatback or the base.

According to this structure, the structural strength of the stopper is increased, such that the stopping portion is able to be received in a more fixed position, by providing the deformation inhibiting member that minimizes bending deformation in the seat width direction following abutment of the stopper and the stopping portion.

In the aspect above, the deformation inhibiting member may be configured to minimize deformation in the seat width direction from the stopper abutting against the stopping portion, by abutting against the stopper or the base in the seat width direction.

According to this structure, the structural strength of the stopper is able to be effectively increased by a simple structure in which the deformation inhibiting member is provided so as to abut against the stopper or the base in the seat width direction.

In the aspect above, the stopping portion may be formed on the seatback. The stopper may be provided pivotally connected to the base and be configured to receive rotational movement from abutting against the stopping portion, by abutting against a stopping surface formed on the base, as well as be configured to be placed in a state that does not stop the forward tilting rotation of the seatback, by retracting rotation of the stopper. Also, the deformation inhibiting member may be configured to minimize deformation in the seat width direction from the stopper abutting against the stopping portion, by abutting against the stopper in the seat width direction.

According to this structure, even if the stopper is a movable structure that is able to be placed in a state that does not stop forward tilting rotation of the seatback, a structure that increases the structural strength of the stopper is able to be obtained by a simple structure in which the deformation inhibiting member is provided so as to abut against the stopper in the seat width direction.

In the aspect above, an inclined guide surface that inhibits rotation of the stopper from being stopped by the stopper bumping into the deformation inhibiting member in the rotational direction, when the stopper rotates to a position where the stopper abuts against the stopping surface, may be formed on the deformation inhibiting member.

According to this structure, by forming the guide surface on the deformation inhibiting member, even if the deformation inhibiting member and the stopper are provided close together in the seat width direction, rotation of the stopper is able to be inhibited from being stopped by the stopper bumping into the deformation inhibiting member in the rotational direction when the stopper rotates to the position where it abuts against the stopping surface of the base. Therefore, the deformation inhibiting member and the stopper are brought close together in the seat width direction, so the structural strength of the stopper is able to be appropriately increased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the accompanying drawings.

Figure 1:
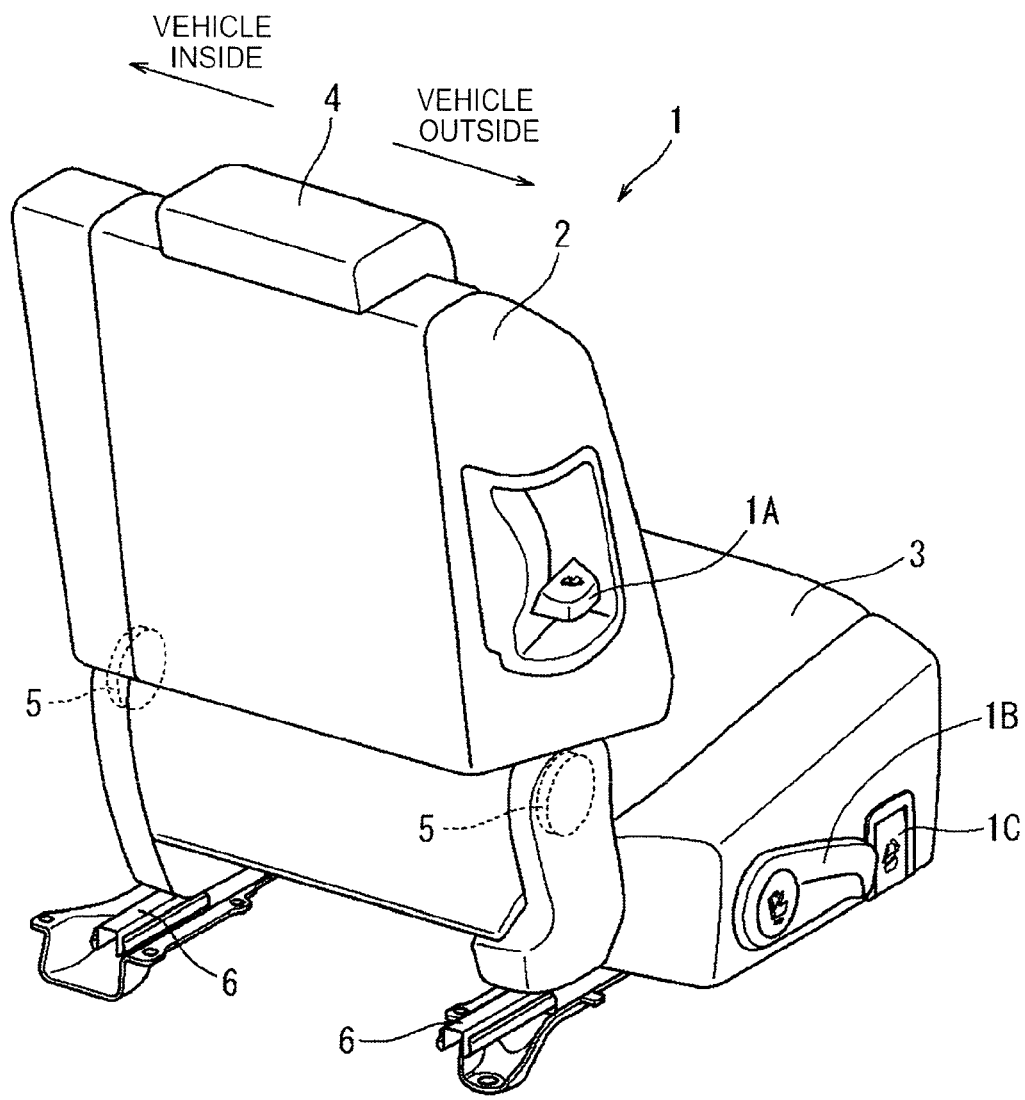
FIG. 1 is a perspective view of the overall structure of a vehicle seat according to one example embodiment of the invention.

First, the structure of a vehicle seat 1 according to one example embodiment will be described with reference to FIGS. 1 to 19. As shown in FIG. 1, the vehicle seat 1 of this example embodiment is configured as a seat for sitting, in a second row behind a driver's seat of a vehicle (an automobile) having three rows of seats. A seat main body of the vehicle seat 1 includes a seatback 2 that serves as a backrest for a seated occupant, a seat cushion 3 that serves as a seating portion, and a headrest 4 that serves as a headrest. The seatback 2 is such that lower end portions on both left and right sides are each connected, via a corresponding disc-shaped reclining device 5 that functions as a rotation shaft device that can brake against rotation, to rear end portions on both left and right sides of the seat cushion 3. As a result, the seatback 2 is connected to the seat cushion 3 in such a manner that the backrest angle in a seat front-rear direction is able to be adjusted.

Figure 2:
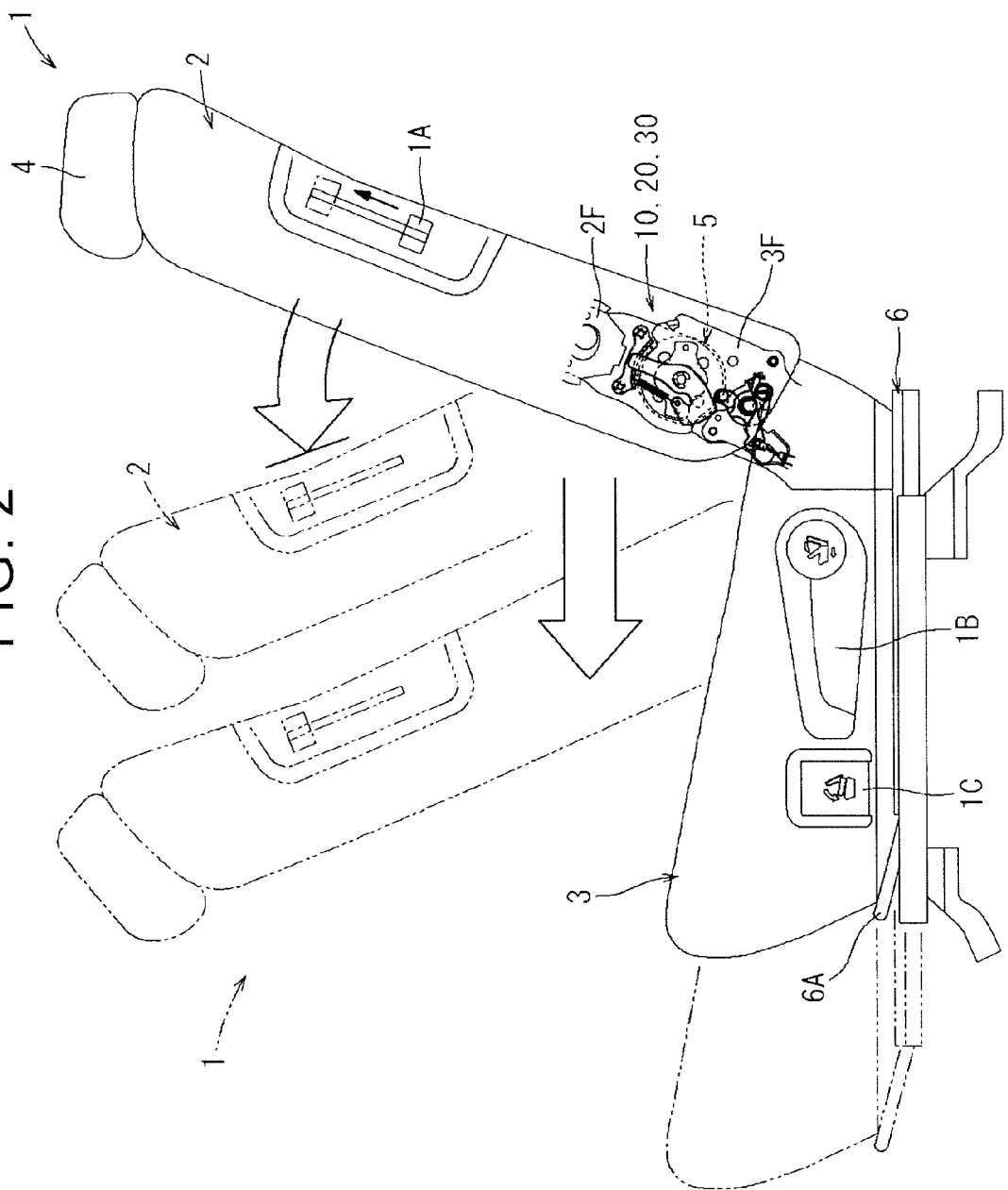
FIG. 2 is a side view of a walk-in operation of the vehicle seat.
Figure 3:
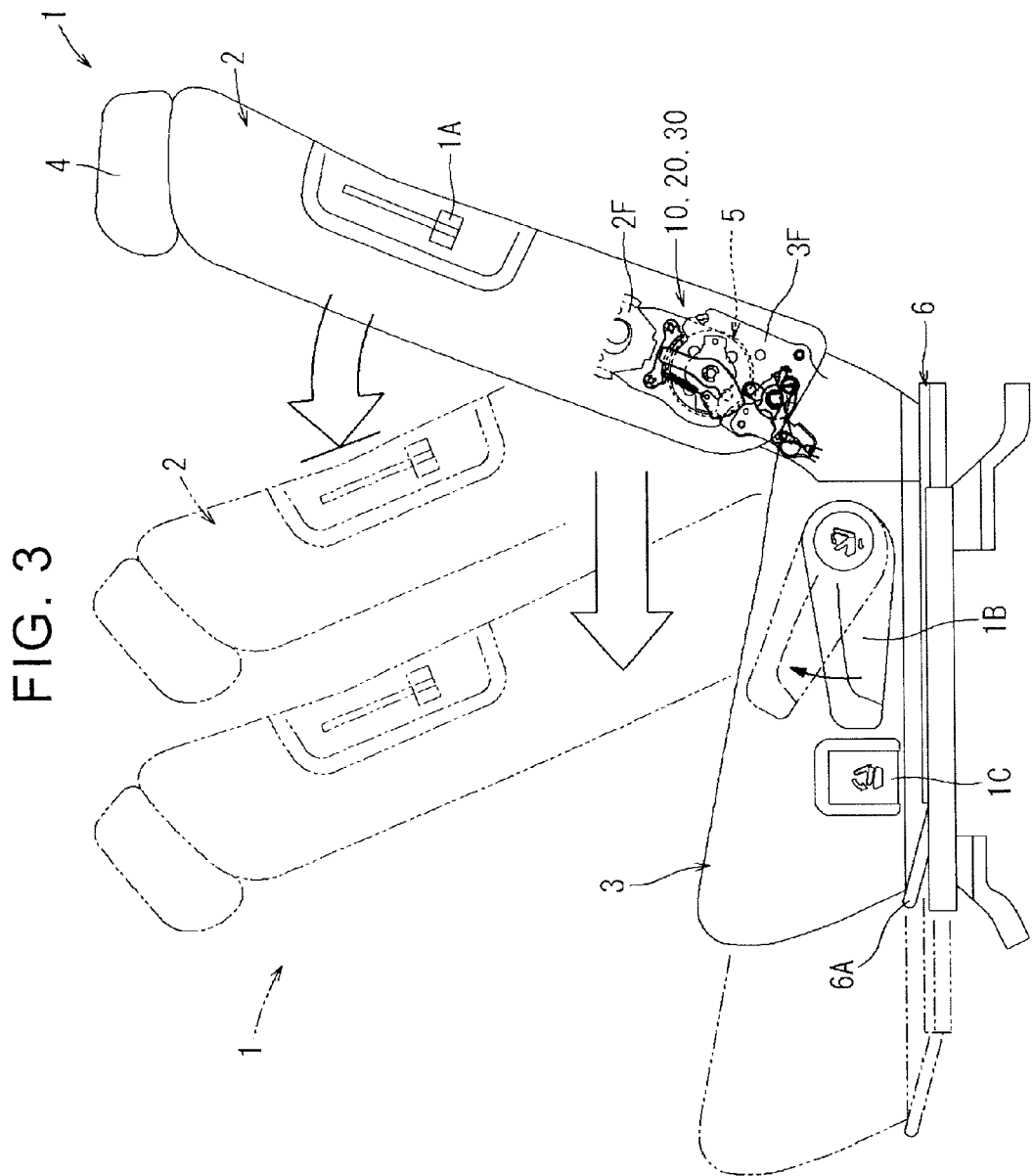
FIG. 3 is a side view of the walk-in operation of the vehicle seat.

The reclining devices 5 are constantly kept in a locked state in which the backrest angle of the seatback 2 is fixed. The reclining devices 5 are able to be unlocked at the same time so as to be switched to a state that enables the seatback 2 to be freely rotated in the front-rear direction of the seat as shown in FIG. 2, thus enabling the backrest angle of the seatback 2 to be adjusted, by a user pulling up on a W/I lever 1A provided on a side portion, on a vehicle outside (the side opposite the side shown in the drawing), of the seatback 2. The reclining devices 5 are also able to be unlocked at the same time so as to be switched to a state that enables the seatback 2 to be freely rotated in the front-rear direction of the seat as shown in FIG. 3, thus enabling the backrest angle of the seatback 2 to be adjusted, by a user pulling up on a cushion lever 1B provided on a side portion, on a vehicle outside, of the seat cushion 3.

Also, after the backrest angle of the seatback 2 has been adjusted to a predetermined angle (i.e., after the seatback 2 has been placed in a predetermined position) by the operation above, the reclining devices 5 are returned to the locked state again, such that the seatback 2 is fixed at the adjusted backrest angle (i.e., in the adjusted position), by stopping the operation of pulling up on the W/I lever 1 or the cushion lever 1B. The basic structure of the reclining devices 5 is the same well-known structure as that described in Japanese Patent Application Publication No. 2011-116303 (JP 2011-116303 A), so a detailed description of this structure will be omitted.

The seat cushion 3 is in a state connected to the floor of the vehicle via a pair of left and right slide devices 6. As a result, the seat cushion 3 is provided such that a located position thereof is able to be adjusted in the front-rear position of the seat with respect to the floor. The slide devices 6 are constantly kept in a locked state in which the located position of the seat cushion 3 is fixed, by an urging structure of a spring member, not shown, provided inside each of these slide devices 6. The slide devices 6 are unlocked at the same time by the user pulling up on a release lever 6A that is connected to the slide devices 6 and provided extending on a front lower portion of the seat cushion 3. This unlocking operation switches the seat cushion 3 to a state in which it is able to be freely slid in the front-rear direction of the seat, so the located position of the seat cushion 3 is able to be adjusted.

Also, after the located position of the seat cushion 3 has been adjusted to a predetermined slide position, the slide devices 6 are returned to the slide-locked state again, such that the seat cushion 3 is fixed at the adjusted slide position, by stopping the operation of pulling up on the release lever 6A. The basic structure of the slide devices 6 is the same well-known structure as that described in Japanese Patent Application Publication No. 2010-221935 (JP 2010-221935 A), so a detailed description of this structure will be omitted.

The headrest 4 is provided attached from above to an upper portion of the seatback 2. More specifically, the headrest 4 is provided fixed (i.e., mounted) to the upper portion of the seatback 2 by two rod-like stays, not shown, that protrude from a lower portion of the headrest 4 being inserted from above into two cylindrical support members that are fixed onto an upper frame 2FA (see FIG. 6) of a seatback frame 2F that forms the frame of the seatback 2. The mounting structure of the headrest 4 is similar to that described in Japanese Patent Application Publication No. 2008-239075 (JP 2008-239075 A), so a detailed description of this structure will be omitted.

Figure 6:
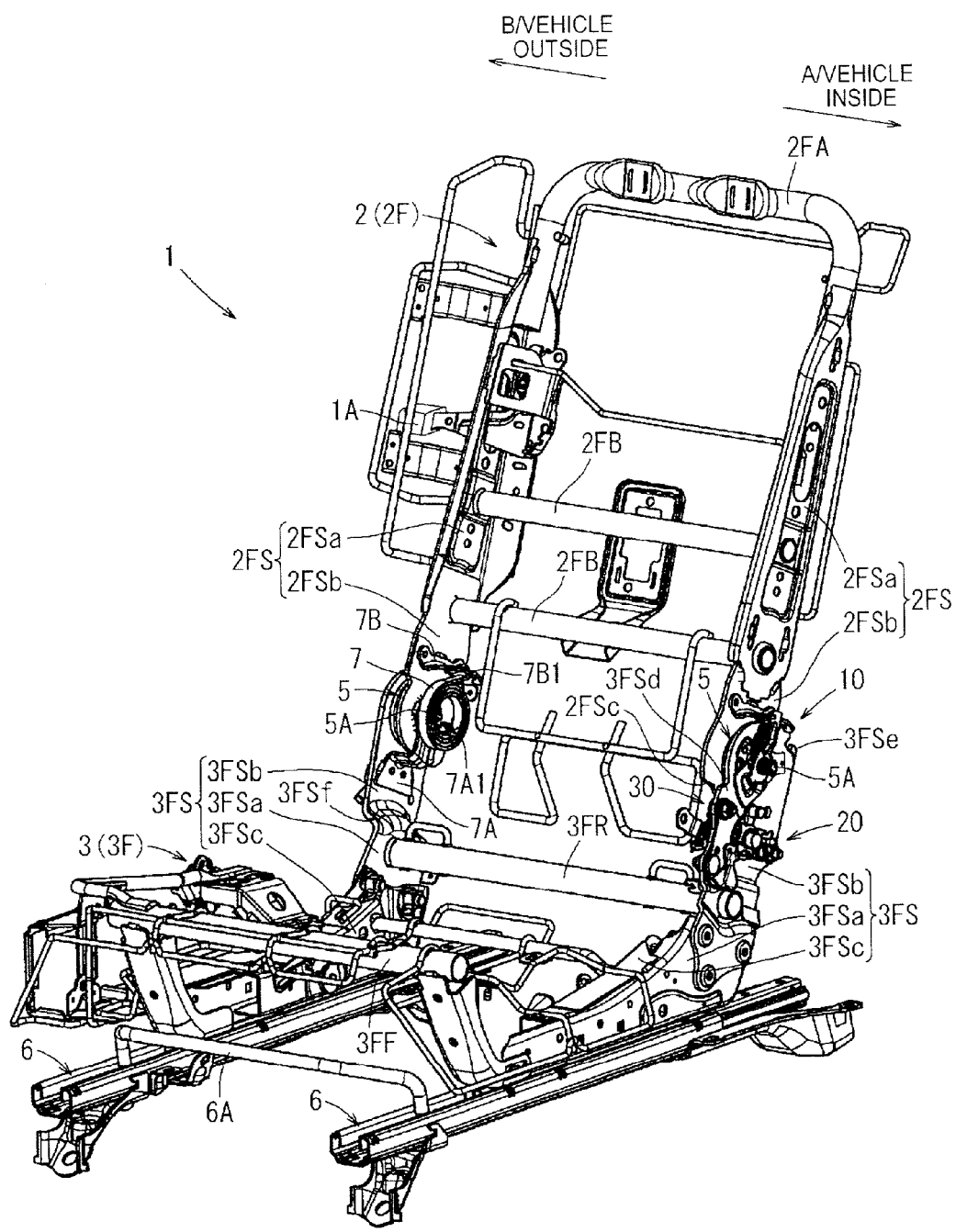
FIG. 6 is a perspective view of a frame structure inside the vehicle seat.
Figure 7:
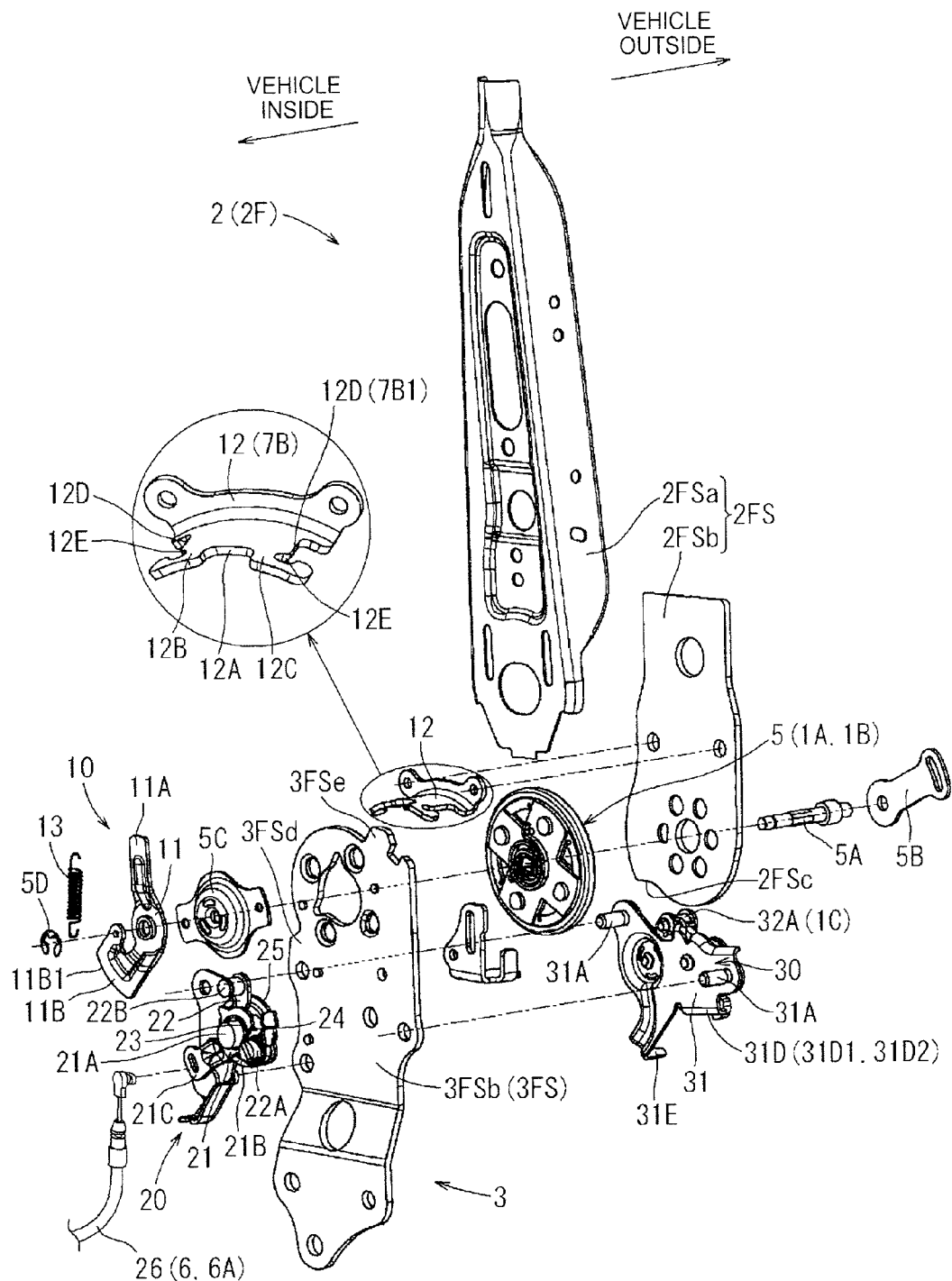
FIG. 7 is an exploded perspective view of the main structure.

Here, a spiral spring 7 (see FIG. 6) that constantly applies rotational urging force to the seatback 2 in a direction toward the front side of the seat is hooked onto a side portion, on the vehicle outside, between the seatback 2 and the seat cushion 3. As a result, when the fixed state of the backrest angle of the seatback 2 is released, the urging force of the spiral spring 7 raises the seatback 2 to a position where it abuts against the back of the seated occupant, and the backrest angle/position of the seatback 2 is adjusted with the seatback 2 following the forward/rearward tilting movement of the back of the seated occupant. The movable region of the seatback 2 described above is set as a region between positions where a bracket 12 that is joined to a side frame 2FS on the vehicle inside of the seatback frame 2F that forms the frame of the seatback 2 is stopped by abutting against a forward-tilt stopper 3FSd and a rearward-tilt stopper 3FSe that are each formed protruding in a horn-shape in the front and rear directions, respectively, on an upper edge portion on a rear side of a same-side side frame 3FS of a seat cushion frame 3F, as shown in FIGS. 6 and 7.

As shown in FIG. 2, the fixed state of the backrest angle of the seatback 2 described above is released by a person (the user) seated in a back row seat pulling up on the W/I lever 1A from behind while no one is seated in the vehicle seat 1. Consequently, the seatback 2 tilts forward from the urging force of the spiral spring 7 (see FIG. 6) described above, and stops when it reaches a forward tilting position, not shown. Also, with the tilting rotation of the seatback 2, the slide-lock state of the slide devices 6 is also released, so the seat cushion 3 switches to a state in which it is able to slide in the front-rear direction of the seat.

Also, as shown in FIG. 3, the fixed state of the backrest angle of the seatback 2 described above is similarly released by the user pulling up on the cushion lever 1B from a position standing outside the vehicle with a passenger door next to the vehicle seat 1 open while no one is seated in the vehicle seat 1. Consequently, the seatback 2 tilts forward from the urging force of the spiral spring 7 (see FIG. 6) described above, and stops when it reaches a forward tilting position, not shown. Also, with the tilting rotation of the seatback 2, the slide-lock state of the slide devices 6 is also released, so the seat cushion 3 switches to a state in which it is able to slide in the front-rear direction of the seat.

In this way, with the vehicle seat 1 of this example embodiment, a walk-in (W/I) operation in which the entire seat is able to be slid forward and retracted in a compact posture in which the seatback 2 is switched to the forward tilted position, as shown in FIGS. 2 and 3, is able to be performed by the slide devices 6 being released in combination with the seatback 2 being tilted forward. This walk-in operation increases the space for a person that will be seated, or is seated, in a third row seat, which is a seat in a row behind the vehicle seat 1, to get in and out of the vehicle through a passenger door that is next to the vehicle seat 1.

Figure 4:
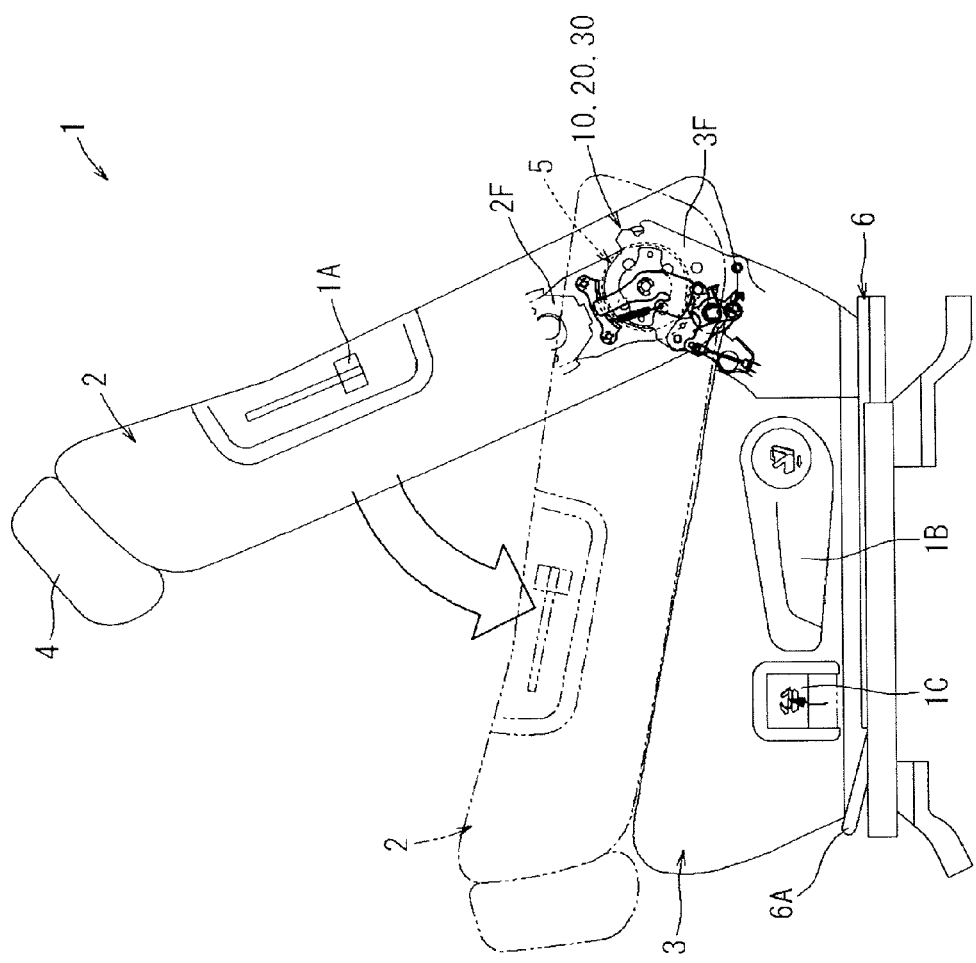
FIG. 4 is a side view of a fold-down operation of the vehicle seat.
Figure 5:
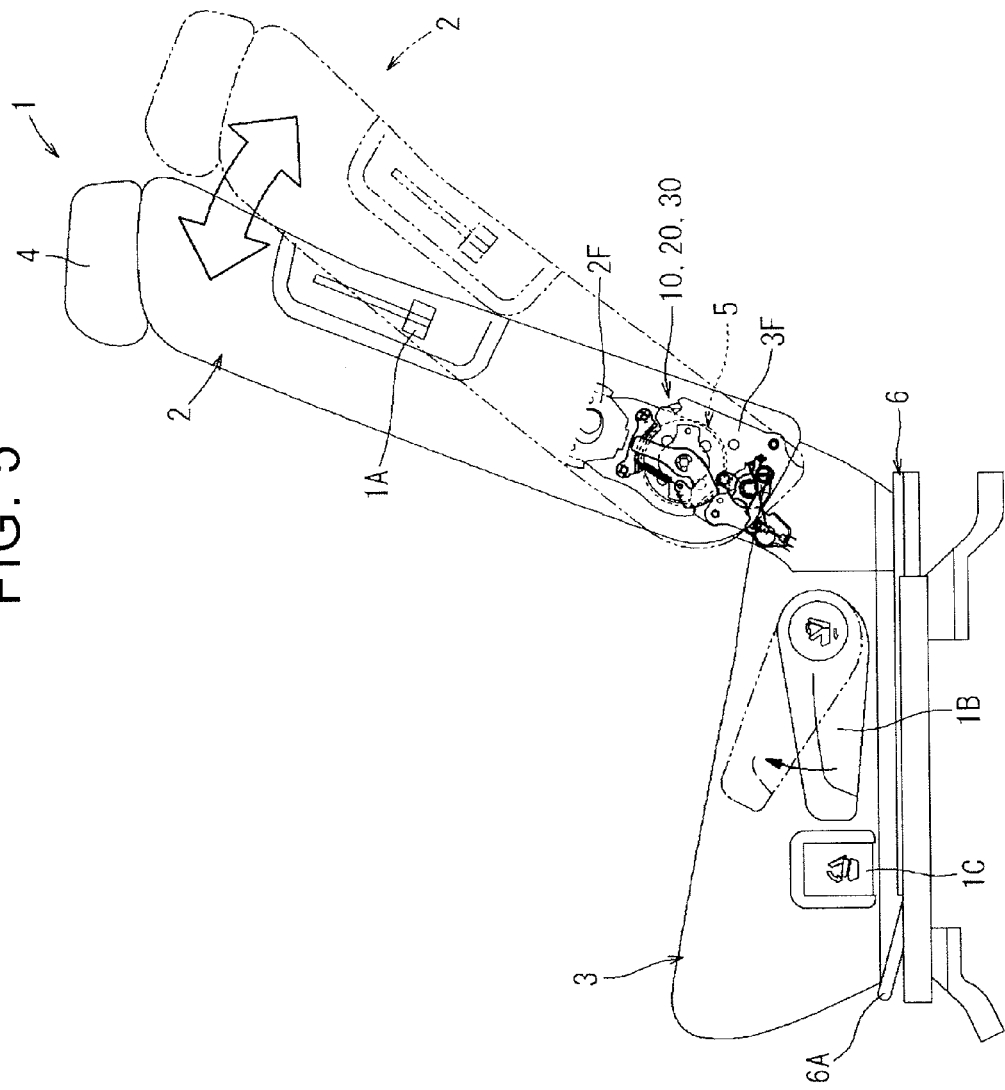
FIG. 5 is a side view of a reclining operation of the vehicle seat.
Figure 11:
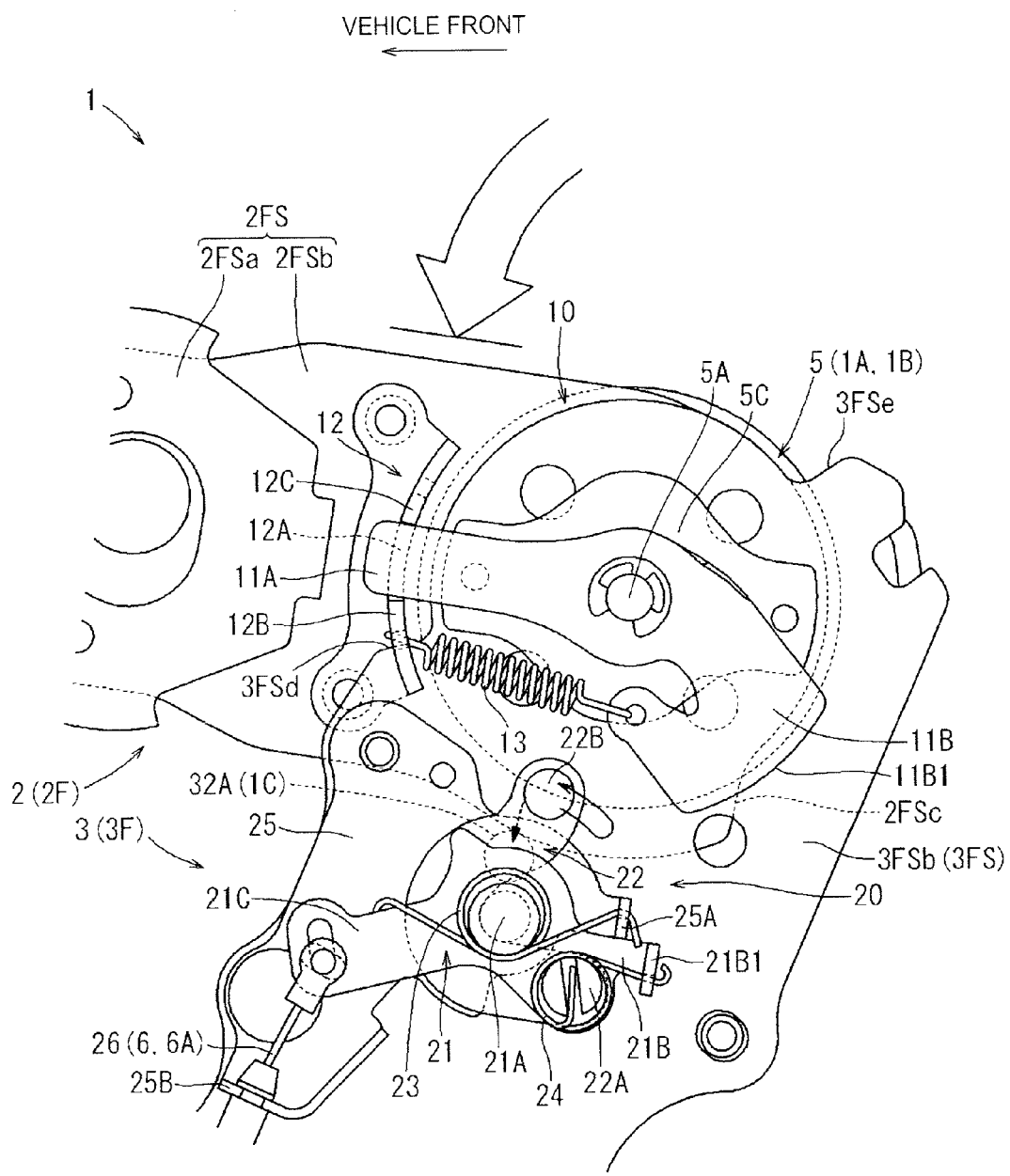
FIG. 11 is an enlarged view of the main portions when the seatback has been folded down to a folded down position.

Also, as shown in FIG. 3, after the seatback 2 has been tilted to the forward tilting position by the user pulling up on the cushion lever 1B from a position standing outside the vehicle with the passenger door of the vehicle open, the seatback 2 is then folded down even farther forward to a folded down position in which the seatback 2 is tilted beyond the forward tilting position and is folded down onto an upper surface portion of the seat cushion 3 (a fold-down (F/D) operation), as shown in FIG. 4, by the user then pulling up on a F/D lever 1C provided on a front side portion, on the vehicle outside (the right side in FIG. 1), of the seat cushion 3. More specifically, the seatback 2 is folded down far forward to a position (i.e., the folded down position) where a bracket 12 that will be described later is stopped by abutting against the forward-tilt stopper 3FSd, as shown in FIG. 11. Also, in combination with this fold-down operation of the seatback 2, the released state of the slide lock of the slide devices 6 described above with reference to FIG. 4 is returned again to the slide-locked state, such that the slide position of the seat cushion 3 is returned to being fixed.

In this way, in combination with the seatback 2 being folded down by the user pulling up on the F/D lever 1C, the entire vehicle seat 1 is able to be folded down so that is low and compact, and placed in a slide-locked state by the slide devices 6 being returned again to the slide-locked state. As a result, the back surface of the folded down seatback 2 is able to be conveniently used as a table surface to put things on. The fold-down operation of the seatback 2 described above will not be performed even if the F/D lever 1C is operated when the seatback 2 is at an upright angle (in an raised and upright position) at which it is normally used as a backrest.

Specifically, this is because the fold-down operation of the seatback 2 is performed in stages. That is, first the cushion lever 1B is operated to tilt the seatback 2 to the forward tilting position, and then the F/D lever 1C is operated to release the state in which the seatback 2 is stopped in this forward tilting position so that the seatback 2 folds down to the folded down position. In this way, the fold-down operation is performed by two operations, so the seatback 2 is able to be folded down more safely than it is when the seatback 2 is folded down all at once to the folded down position by a single operation.

Next, the structure of each portion of the vehicle seat 1 will be described in further detail. In the description below, the operation of tilting the seatback 2 to the forward tilting position by operating the W/I lever 1A or the cushion lever 1B will be referred to as a "walk-in (W/I) operation", and the operation of further folding down the seatback 2 to the folded down position by operating the F/D lever 1C will be referred to as a "fold-down (F/D) operation". First, the structure of the seatback 2 will be described. As shown in FIG. 6, the seatback 2 has a seatback frame 2F that forms the internal frame of the seatback 2. This seatback frame 2F is formed by a pair of left and right vertically long plate-shaped side frames 2FS, an upper frame 2FA that is formed by an inverted U-shaped pipe that extends between upper end portions of the side frames 2FS, and reinforcing pipes 2FB formed by two horizontally long pipes lined up in the height direction and extending between the side frames 2FS, that have all been assembled so as to form an integrated frame shape. Hereinafter, whenever possible in this example embodiment, portions provided in plurality will be described in the singular form to facilitate understanding.

Each of the side frames 2FS is formed by a thin plate part 2FSa made of a thin steel sheet, and a thick plate part 2FSb made of a steel sheet that is thicker than the thin plate part 2FSa, that are integrally connected together one above the other. More specifically, the thin plate part 2FSa is formed by first cutting a single thin steel sheet in a vertically long plate shape, and then bending the edge portions on the front and rear sides into a flange shape toward the seat inside. As a result, the thin plate part 2FSa has increased structural strength with respect to bending and twisting by the press-bent edge portions, and is formed in a shape that has no sharp angles on the outside (the seat front and rear sides and the seat outside).

The thick plate part 2FSb is formed by a steel sheet that is thicker than the thin plate part 2FSa being cut in a vertically long flat plate shape. The thick plate part 2FSb is placed such that a plate surface of an upper portion overlaps with a surface portion, on the seat inside, of a lower portion of the thin plate part 2FSa, and the two are integrally and strongly fixed together by welding. The thick plate parts 2FSb are joining portions that join together with the reclining devices 5 when the seatback frame 2F is connected to the seat cushion frame 3F, and are portions that receive a high load when in use, so the thickness is made thicker than that of the thin plate parts 2FSa, and as a result, the structural strength is increased. The side frames 2FS that are formed by the thin plate parts 2FSa and the thick plate parts 2FSb form the frame of both the left and right sides of the seatback 2, and are arranged with the plate surfaces facing each other in the seat width direction, on both sides of the seatback 2.

The upper frame 2FA is formed by first cutting a single circular steel pipe to a predetermined length, and then bending this pipe into a vertically inverted (upside down) U-shape. Both inverted U-shaped leg portions of the upper frame 2FA are integrally and strongly joined to the upper end portions of these thin plate parts 2FSa by being placed against and welded to the upper end portions of the thin plate parts 2FSa of the side frames 2FS. Here, the upper end portions of the thin plate parts 2FSa of the side frames 2FS are formed bent in semicircular cylindrical shapes that match the shapes of the outer peripheral surfaces of the leg portions of the upper frame 2FA. As a result, the leg portions of the upper frame 2FA are placed in a state of wide surface contact with the upper end portions that are bent in the semicircular cylindrical shape of the thin plate parts 2FSa, and then integrally and strongly welded (i.e., joined) over a wide area.

Each reinforcing pipe 2FB is provided by first cutting a single circular steel pipe to a predetermined length, then inserting it through and extending between the side frames 2FS in the seat width direction, and integrally and strongly joining the inserted end portions by welding to the side frames 2FS. More specifically, the reinforcing pipe 2FB on the upper side is inserted through and extending between the thin plate parts 2FSa of the side frames 2FS in the seat width direction, and the inserted end portions are integrally and strongly joined to the thin plate parts 2FSa by welding. Also, the reinforcing pipe 2FB on the lower side is inserted in the seat width direction through and extending between overlapping portions where the thin plate part 2FSa and the thick plate part 2FSb of each side frame 2FS overlap in the seat width direction, and the inserted end portions are integrally and strongly joined to the overlapping thin plate parts 2FSa and the thick plate parts 2FSb by welding. As a result, the thin plate part 2FSa and the thick plate part 2FSb of each side frame 2FS are integrally and strongly joined together via the reinforcing pipe 2FB on the lower side that is inserted through and extends between the overlapping portions.

With the seat cushion 3, a seat cushion frame 3F that forms the internal frame of the seat cushion 3 is formed by a pair of left and right plate-shaped side frames 3FS that are long in the front-rear direction, a horizontally long pipe-shaped front frame 3FF that extends between front end portions of the side frames 3FS, and a horizontally long pipe-shaped rear frame 3FR that extends between rear end portions of both side frames 3FS, that have all been assembled so as to form an integrated frame shape.

Each side frame 3FS is formed by a thin plate part 3FSa made of thin steel plate, and a thick plate part 3FSb made of steel plate that is thicker than the thin plate part 3FSa, that are integrally connected together. More specifically, each thin plate part 3FSa is formed by first cutting a single thick steel sheet in a shape that is long in the front-rear direction, and then bending the edge portions on the front and rear sides into a flange shape toward the seat inside. Further, a reinforcing plate 3FSc that closes the sectional shape that is open in a U-shape to make it a closed box-shape extends between the edge portions on the upper and lower sides of the portions that are bent toward the seat inside, is integrally welded, and thus joined, to the thin plate part 3FSa. As a result, the thin plate part 3FSa has increased structural strength with respect to bending and twisting, and is formed in a shape that has no sharp angles on the outside (the seat upper and lower sides and the seat outside).

The thick plate part 3FSb is formed by a steel sheet that is thicker than the thin plate part 3FSa being cut in a vertically long plate shape. The thick plate part 3FSb is placed such that a plate surface of a lower portion overlaps with a surface portion, on the seat outside, of an upper portion on a rear end side of the thin plate part 3FSa, and the two are integrally and strongly fixed together by welding. The thick plate parts 3FSb are joining portions that are joined together with the reclining devices 5 when the seat cushion 3 is connected to the seatback frame 2F, and are portions that receive a high load when in use, so the thickness is made thicker than that of the thin plate parts 3FSa, and as a result, the structural strength is increased.

The side frames 3FS that are formed by the thin plate parts 3FSa and the thick plate parts 3FSb form the frame of both the left and right sides of the seat cushion 3, and are arranged with the plate surfaces facing each other in the seat width direction, on both sides of the seat cushion 3. More specifically, the thin plate parts 3FSa of the side frames 3FS that are long in the seat front-rear direction are fixed arranged on the upper surface portion of the pair of left and right slide devices 6 that are provided on the floor as described above.

Here, as shown in FIGS. 6 and 7, the forward-tilt stopper 3FSd and the rearward-tilt stopper 3FSe that each protrude in a horn-shape are provided on front and rear portions, respectively, of the upper edge portion of the thick plate part 3FSb of the side frame 3FS, on the vehicle inside, of the seat cushion 3. Also, the bracket 12 that is formed by a thick steel plate that abuts against and engages with the forward-tilt stopper 3FSd and the rearward-tilt stopper 3FSe is provided joined to the outside surface of the thick plate part 2FSb of the same-side side frame 2FS of the seatback 2. In this way, the forward-tilt stopper 3FSd, the rearward-tilt stopper 3FSe, and the bracket 12 that form the stopping structure when the seatback 2 is tilted in the front-rear direction are each provided on the thick plate part 2FSb of the seatback 2 and the thick plate part 3FSb of the seat cushion 3 that have high structural strength, so tilting rotation of a heavy object such as the seatback 2 is able to be stopped with high stopping force.

Also, as shown in FIG. 6, the spiral spring 7 that applies rotational urging force to the seatback 2 in a direction toward the front side of the seat is hooked between the side frame 2FS on the vehicle outside (the left side when looking at the drawing) of the seatback 2 and the side frame 3FS on the vehicle outside of the seat cushion 3. More specifically, the spiral spring 7 is fixed with an inside end portion thereof hooked onto a catch portion 7A1 that extends toward the seat upper side of a spring catch plate 7A that is joined to an inside surface of the thick plate part 3FSb of the side frame 3FS of the seat cushion 3, and an outside end portion of the spiral spring 7 hooked onto a spring catch recessed portion 7B1 formed in a recessed shape on a rear edge portion of a spring catch plate 7B that is joined to the inside surface of the thick plate part 2FSb of the side frame 2FS of the seatback 2. The spring catch plate 7B is formed by the structure of the same part as the bracket 12 that will be described later. In this way, the spiral spring 7 is hooked between the thick plate part 2FSb of the seatback 2 and the thick plate part 3FSb of the seat cushion 3 that have high structural strength, so the spiral spring 7 that is set to a strong rotational urging force capable of raising a heavy object such as the seatback 2 is provided firmly hooked between the seatback 2 and the seat cushion 3.

Also, the thick plate part 3FSb of the side frame 3FS on the vehicle outside of the seat cushion 3 is formed in a stepped shape with a middle portion thereof being an offset portion 3FSf and a lower portion being bent inward in a crank shape toward the seat inside with respect to the upper portion. Forming the thick plate part 3FSb in a stepped shape set in toward the seat inside in this way allows for more legroom when a person that will be seated, or is seated, in a seat in the third row gets in or out through a passenger door, not shown, next to the vehicle seat 1 that is in the second row.

The front frame 3FF is formed by a single circular steel pipe that has been cut to a predetermined length, placed extending in the seat width direction between upper portions on the front end side of the thin plate parts 3FSa of the side frames 3FS, and then integrally welded and fixed in place. The rear frame 3FR is formed by single circular steel pipe, that has been cut to a predetermined length, being inserted through and extending between the thick plate parts 3FSb of the side frames 3FS in the seat width direction. The inserted end portions are then welded to the side frames 3FS, so as to be integrally and strongly joined to the thick plate parts 3FSb of the side frames 3FS.

Next, the structure of a detection mechanism 10 that picks up movement when a walk-in operation is performed on the seatback 2, and an operating mechanism 20 for releasing the slide-lock state of the slide devices 6 according to an operation movement amount detected by the detection mechanism 10, will be described. The detection mechanism 10 and the operating mechanism 20 are provided on a side surface portion on the outside of the side frame 3FS on the vehicle inside of the seat cushion 3, as shown in FIGS. 6 and 7. The detection mechanism 10 includes an operating link 11 that is pivotally connected to the side frame 3FS of the seat cushion 3, the bracket 12 that is fixed to the side frame 2FS of the seatback 2, and a tension spring 13 hooked between the bracket 12 and the operating link 11.

The operating link 11 is assembled in a state pivotally connected to an operating shaft 5A that is inserted through a center portion of the reclining device 5 described above, as shown in FIG. 7. More specifically, the operating link 11 is assembled in a state pivotally connected to the operating shaft 5A, by the operating shaft 5A being inserted through the center portion of the operating link 11, and the inserted tip end portion of the operating shaft 5A then retained so as not to slip out in the axial direction by an E-ring 5D. The operating link 11 is provided so as to be able to rotate smoothly, while positioned in the axial direction with respect to the operating shaft 5A, by being sandwiched from both sides, so as not to be in much planar contact in the axial direction, by the E-ring 5D, and a plate bracket 5C having a shape in which the center portion bulges out in a mountain shape, that is provided integrally joined to the side frame 3FS of the seat cushion 3.

More specifically, the operating shaft 5A is assembled in a state inserted from the seat inside through the side frame 2FS of the seatback 2, and then inserted through the center portion of the reclining device 5, the side frame 3FS of the seat cushion 3, the plate bracket 5C that is integrally joined to the side frame 3FS, and the operating link 11, in the axial direction in this order. Then the E-ring 5D is attached to the inserted tip end portion to keep the operating shaft 5A from slipping out in the axial direction. The operating shaft 5A is constantly held in a fixed position by the retaining force with which the reclining device 5 is kept in a locked state by the urging force of a spring, not shown.

Figure 16:
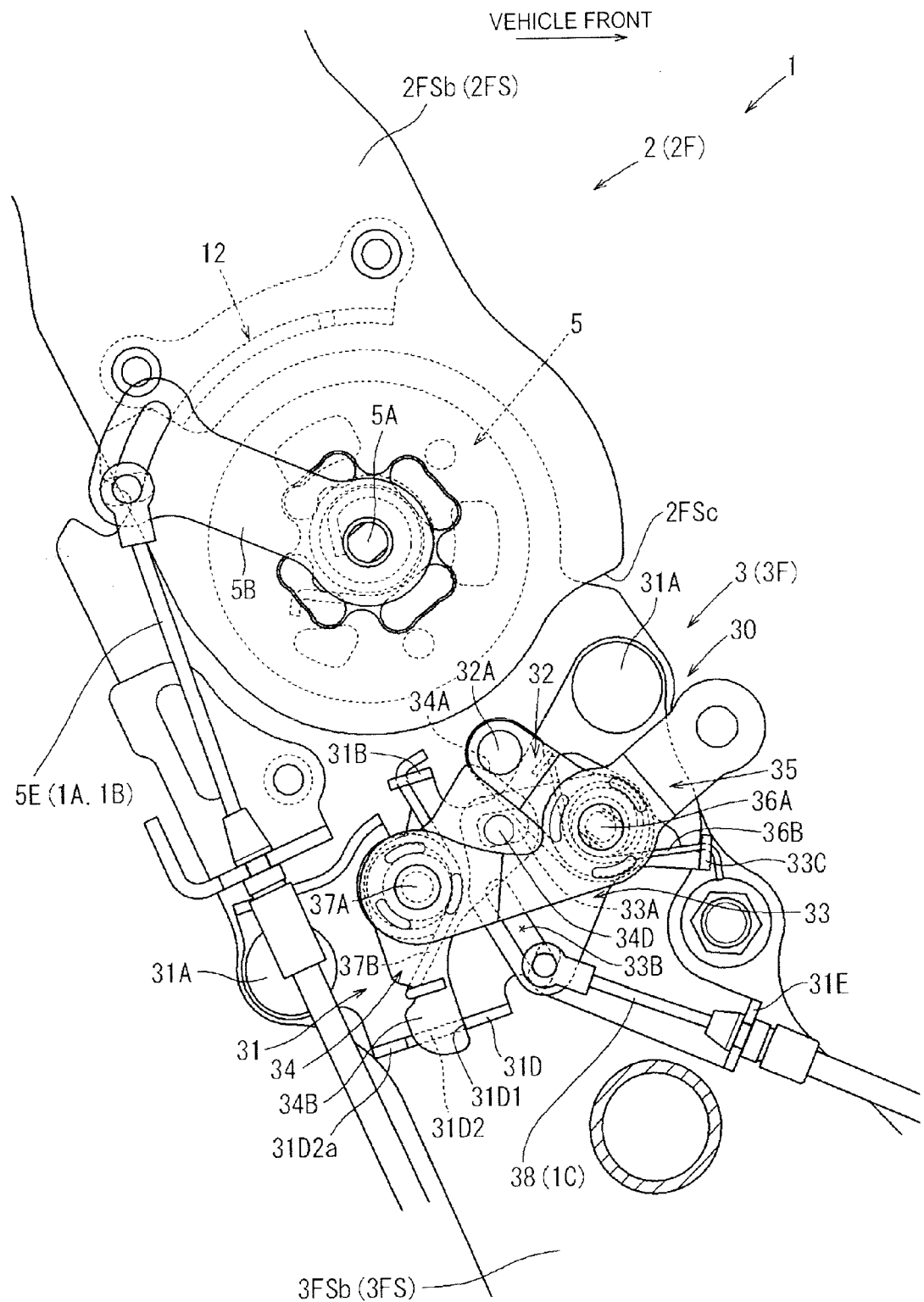
FIG. 16 is a side view of the stopper mechanism when the seatback is in the initial position.

The operating shaft 5A rotates against the spring urging force, thereby unlocking the reclining device 5, by an operating arm 5B that is integrally joined to an end portion on the head side (the seat inside) of the operating shaft 5A being rotated via a release cable, not shown, in response to operation of the W/I lever 1A or the cushion lever 1B. As shown in FIG. 16, an operating structure formed by the operating shaft 5A and the operating min 5B that are rotated in response to operation of the W/I lever 1A or the cushion lever 1B is also arranged on the reclining device 5 on the vehicle outside. A release cable 5E that is pulled in response to operation of the W/I lever 1A or the cushion lever 1B is connected to the operating arm 5B. The operating arm 5B rotates against the spring urging force, and consequently unlocks the reclining device 5, by being rotated via the release cable 5E in response to operation of these levers 1A and 1B. According to this structure, the locked states of the reclining devices 5 on both sides are able to be released at the same time in synchronization on the left and right, by the W/I lever 1A or the cushion lever 1B being operated.

Figure 8:
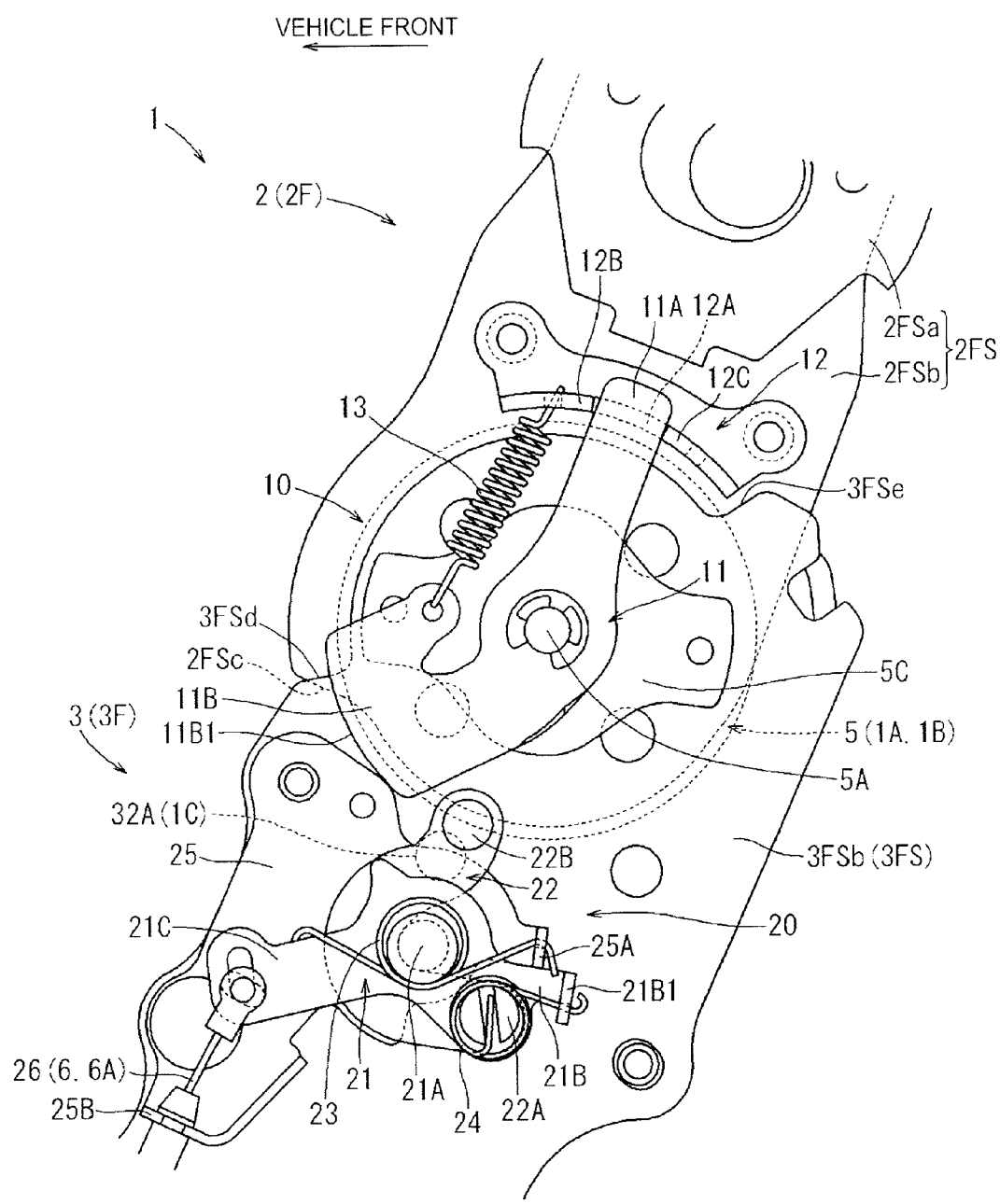
FIG. 8 is an enlarged view of the main portions when a seatback is in an initial position.
Figure 9:
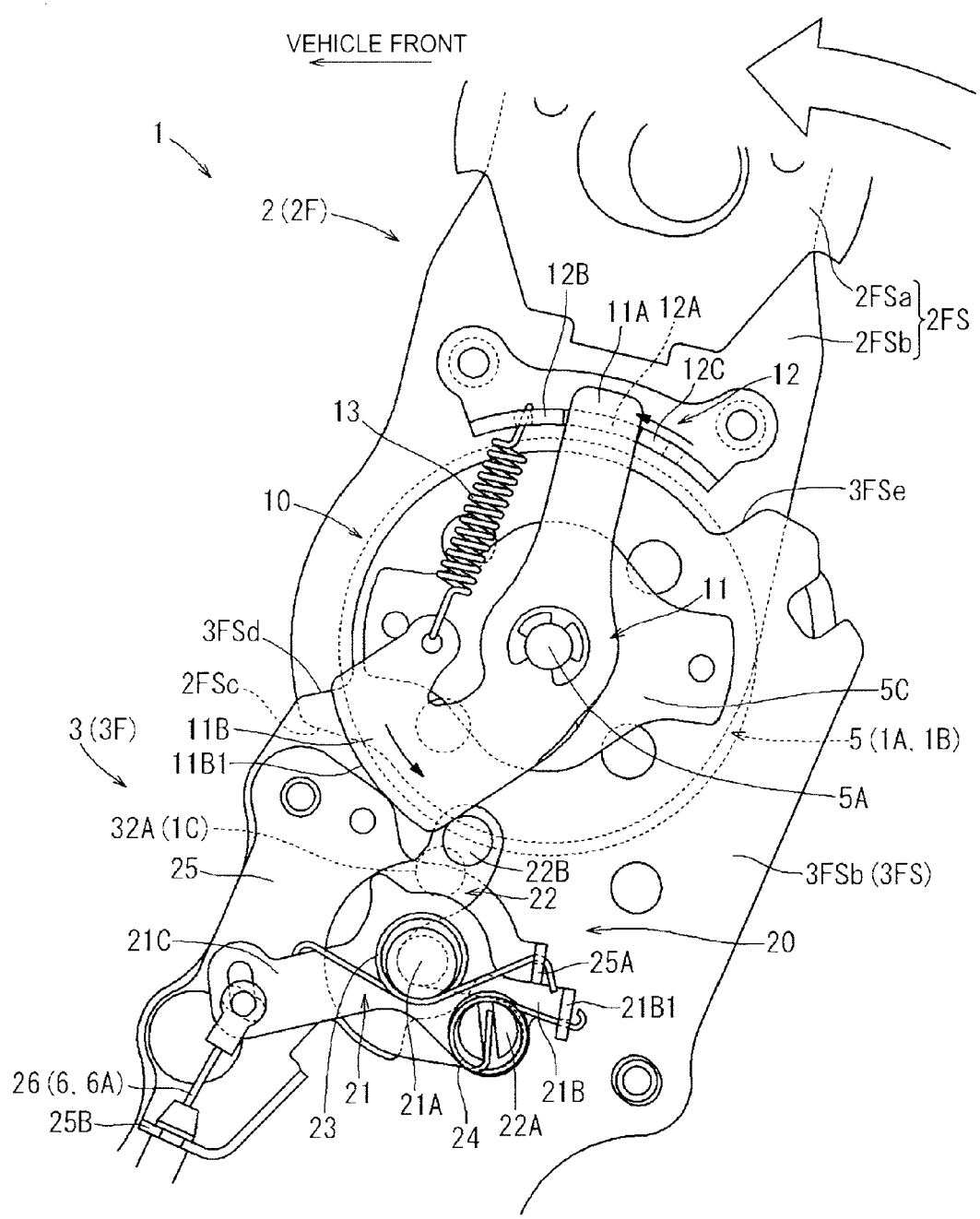
FIG. 9 is an enlarged view of the main portions when the seatback is in the middle of a walk-in operation.
Figure 10:
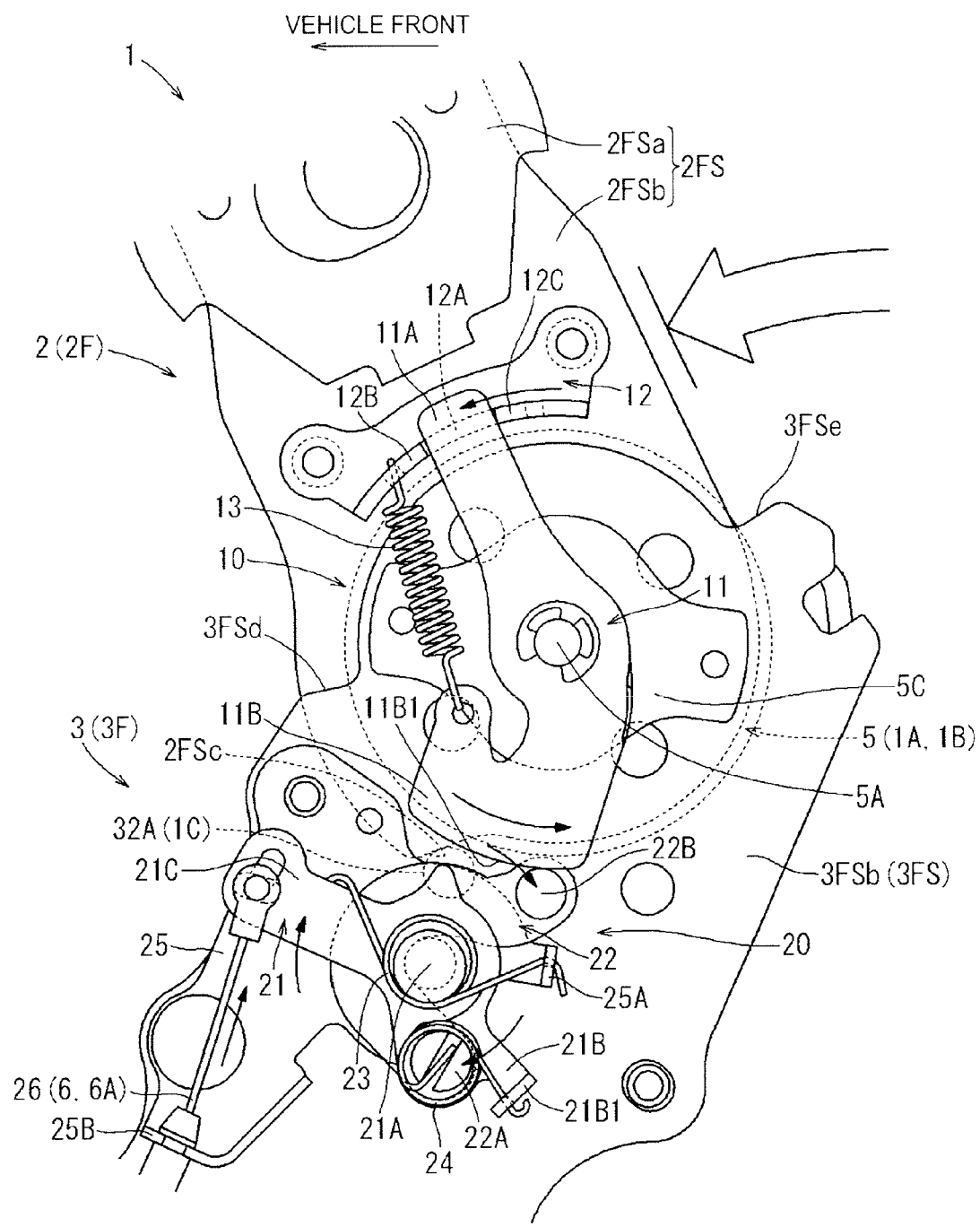
FIG. 10 is an enlarged view of the main portions when the seatback is tilted to a forward tilting position.
Figure 13:
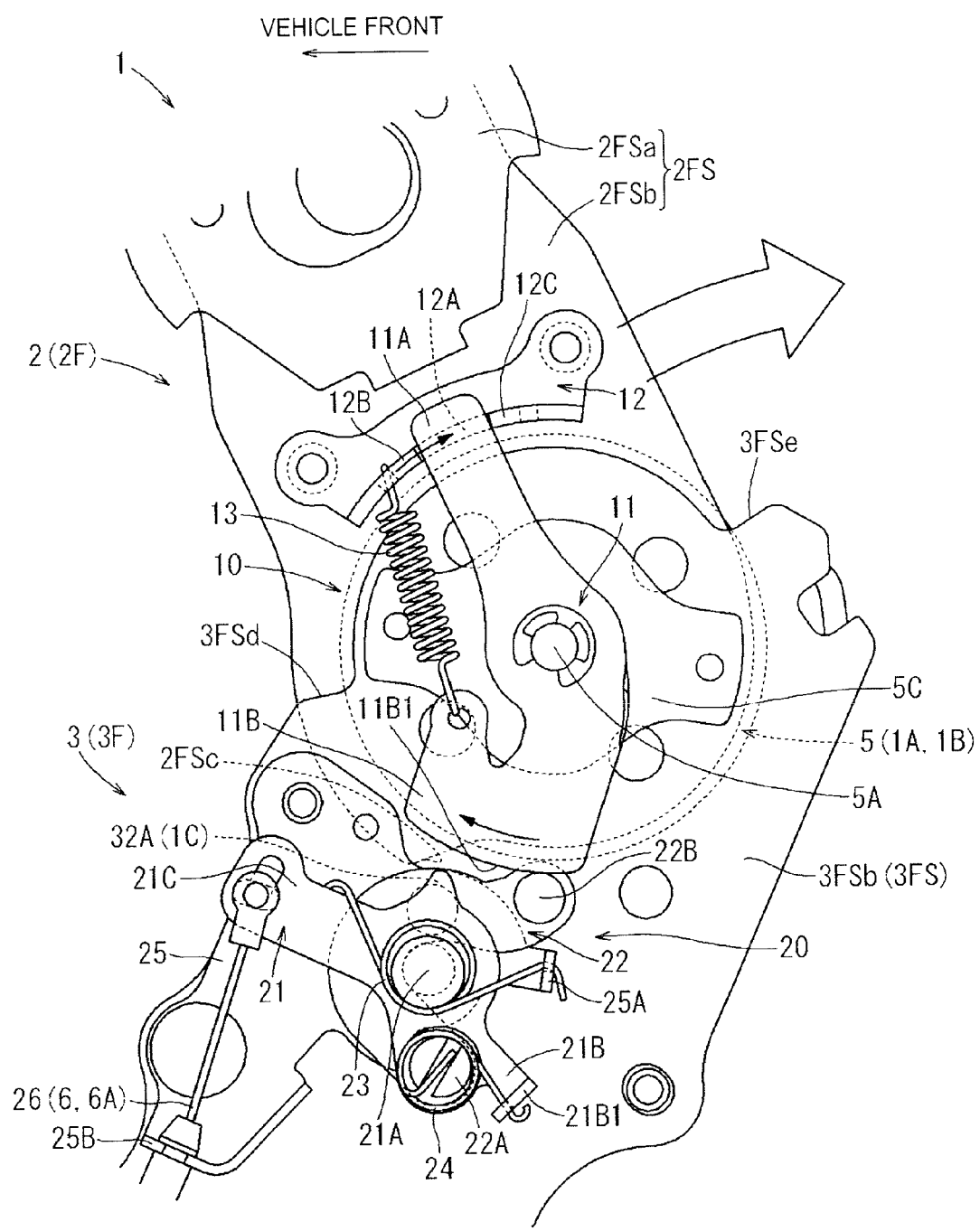
FIG. 13 is an enlarged view of the main portions when the seatback is in the middle of being raised from the forward tilting position.

As shown in FIG. 8, the operating link 11 has a kick portion 11A that extends toward the seat upper side from the center portion that is pivotally connected by the operating shaft 5A. This kick portion 11A passes through the inside the recessed portion 12A of the bracket 12 that will be described later, and is sandwiched from the front and rear by the bracket 12. As a result, when the seatback 2 is tilted forward, the operating link 11 is consequently forcibly rotated counterclockwise in the drawing, with the kick portion 11A that will be described later being pushed and kicked from the rear by a rear portion 12C of the bracket 12, as shown in FIGS. 9 and 10. Also, when the seatback 2 is raised (i.e., pushed back) after being tilted forward, the operating link 11 is consequently forcibly rotated clockwise in the drawing, with the kick portion 11A that will be described later being pushed and kicked from the front by a front portion 12B of the bracket 12, as shown in FIG. 13.

The bracket 12 is formed bent in an L-shaped plate shape, and a plate portion that is bent such that the surface extends in the height direction is provided integrally fastened and fixed to the outside surface of the thick plate part 2FSb of the side frame 2FS of the seatback 2, as shown in FIG. 7. In this bracket 12, the recessed portion 12A that is cut in a cylindrical shape is formed on a tip edge portion that extends bent toward the seat outside from a joining portion where the bracket 12 joins the side frame 2FS of the seatback 2. The kick portion 11A of the operating link 11 is set inserted from the seat outside into this recessed portion 12A. Thus, the kick portion 11A of the operating link 11 that is set in the recessed portion 12A is sandwiched from the front and rear by the front portion 12B and the rear portion 12C that sandwich the recessed portion 12A of the bracket 12.

The tension spring 13 is hooked between a push portion 11B that extends out in fan-like shape forward and downward with respect to the seat from the center portion of the operating link 11, and a front portion 12B of the bracket 12. The tension spring 13 is configured to apply rotational urging force to the operating link 11 in a clockwise direction in the drawing. This spring urging force of the tension spring 13 constantly keeps the kick portion 11A of the operating link 11 pushed against a rear portion 12C of the bracket 12, thereby suppressing backlash in the rotational direction between the operating link 11 and the bracket 12.

Here, the bracket 12 has a spring catch recessed portion 12D that is cut in a cylindrical shape formed on each edge portion on the front and rear sides of a plate portion of the bracket 12 that extends on the seat outside. Further, an extended recessed portion 12E is formed at corner portions on the seat outside of these spring catch recessed portions 12D, in a manner further extending a void shape of these corner portions in a round hole shape. A front-side portion of each extended recessed portion 12E functions as a catch portion for hooking the upper end portion of the tension spring 13 onto the front portion 12B of the bracket 12. A rear-side portion of each extended recessed portion 12E is not used in this example embodiment, but it is formed in advance to enable the versatile use of the same part when the bracket 12 is used facing the opposite direction in the front-rear direction. Also, the spring catch recessed portions 12D are also not used in this example embodiment. The rear-side portion of these spring catch recessed portions 12D, of the spring catch plate 7B formed by the same part as the bracket 12, functions as a portion (i.e., the spring catch recessed portion 7B1) for hooking the outside end portion of the spiral spring 7 onto, as shown in FIG. 6.

Next, the operating mechanism 20 will be described with reference to FIGS. 7 and 8. The operating mechanism 20 includes an output link 21, an intermediate link 22, a retaining spring 23, a pressing spring 24, a fixing plate 25, and a cable 26. The output link 21 is provided in a state pivotally connected to an outside surface of the thick plate part 3FSb of the side frame 3FS of the seat cushion 3 by a spindle 21A, as shown in FIG. 8. More specifically, the output link 21 is provided in a state pivotally connected by the spindle 21A to the fixing plate 25 that is integrally joined to the thick plate part 3FSb. The fixing plate 25 is provided in a state integrally and strongly joined by welding to the outside surface of the thick plate part 3FSb.

A retaining spring 23 (a torsion spring) is hooked between the output link 21 and a stopping piece 25A that is partially cut out and bent up from a portion of the fixing plate 25, such that the output link 21 is constantly kept rotatably urged in the counterclockwise direction in the drawing, with a stopping arm 21B that extends toward the right in the drawing from the center portion of the output link 21 kept pushed against and engaged with the stopping piece 25A of the fixing plate 25, by the urging force of this retaining spring 23. A wound portion of the center portion of the retaining spring 23 is wound around the spindle 21A. One end on the right side in the drawing is hooked onto the stopping piece 25A, and the other end on the left side is fixed by being hooked onto an operating arm 21C that extends toward the left in the drawing from the center portion of the output link 21.

The intermediate link 22 is formed curved in a C-shape. A lower end portion of the intermediate link 22 in the drawing is provided pivotally connected to the output link 21 by a connecting shaft 22A. More specifically, the connecting shaft 22A is integrally joined to the intermediate link 22, and is pivotally connected to the stopping arm 21B of the output link 21. The pressing spring 24 (a torsion spring) is hooked between the intermediate link 22 and the output link 21, such that the intermediate link 22 is constantly kept in a state rotatably urged in the clockwise direction in the drawing, with an arm shape of the intermediate link 22 that is curved in a C-shape kept in a rotated position in which it is pushed against and engaged with the spindle 21A of the output link 21, by the urging force of this pressing spring 24. The inside end portion of the pressing spring 24 is fixed by being hooked onto a head portion of the connecting shaft 22A that is integrated with the intermediate link 22. The outside end portion of the pressing spring 24 is fixed by being hooked onto a bent stopping piece 21B1 at a tip end portion of the stopping arm 21B of the output link 21.

When the seatback 2 is at an angle/position in which it is used as a backrest, as shown in FIG. 8, a kick pin 22B that is joined to an upper end portion of the intermediate link 22 is kept in an initial position in which it is separated to the rear from the push portion 11B of the operating link 11. However, as shown in FIG. 9, when a walk-in operation starts to be performed on the seatback 2 and the kick portion 11A of the operating link 11 is pushed around to the front side by the rear portion 12C of the bracket 12, the push portion 11B of the operating link 11 abuts against the kick pin 22B of the intermediate link 22. As a result, as shown in FIG. 10, the intermediate link 22 is pushed around in the direction in which it is pushed against the spindle 21A, and rotates, together with the output link 21 that is connected via the connecting shaft 22A, in the clockwise direction in the drawing around the spindle 21A. When the output link 21 rotates in this way, the cable 26 that is connected to the tip of the operating arm 21C of the output link 21 is consequently pulled, thereby releasing the slide-lock state of the slide device 6.

The cable 26 has a double layered cable structure in which a linear wire member is inserted through the inside of a flexible tubular member. The upper end portion of the tubular member of the cable 26 that is shown is fixed by being hooked onto a cable catch piece 25B that is partially cut out and bent up from the fixing plate 25. The upper end portion of the wire member that runs out from the upper end portion of this tubular member is fixed by being hooked onto a tip end portion of the operating arm 21C of the output link 21, which extends to the left in the drawing. Also, the other end portion of the cable 26, not shown, is connected to the release lever 6A that releases the slide-lock state of the slide device 6 in the FIG. 6. Therefore, as shown in FIG. 10, when the intermediate link 22 and the output link 21 rotate together in the clockwise direction in the drawing in response to a walk-in operation of the seatback 2, the cable 26 is pulled upward in the drawing by the output link 21, thereby operating the release lever 6A that is connected to the other end portion of the cable 26 (see FIG. 6) and releasing the slide-lock state of the slide device 6.

As shown in FIG. 10, when the seatback 2 is tilted to the forward tilting position and stopped there, the cable 26 is kept in a pulled state by the kick pin 22B of the intermediate link 22 being kept in a state in which it is riding up on the outer peripheral surface 11B1 of the push portion 11B of the operating link 11. As a result, the slide device 6 (see FIG. 6) is kept in a state in which the slide lock is released.

When the seatback 2 is tilted to the forward tilting position and stopped there, pressing force radially inward toward the center portion of the operating link 11 is applied toward the outer peripheral surface 11B1 of the push portion 11B of the operating link 11 from the kick pin 22B of the intermediate link 22 by the spring force action of the retaining spring 23 and the pressing spring 24, as well as the spring force action of a spring member that is not shown that is provided inside the slide device 6 (FIG. 6) and urges it in the slide-lock direction. Therefore, when a walk-in operation of the seatback 2 is performed, the operating link 11 is forcibly pushed around toward the front side by the rear portion 12C of the bracket 12 that is integrally joined to the side frame 2FS of the seatback 2, so the operating link 11 is able to smoothly push the kick pin 22B around, which is good. However, when an attempt is made to return the tilted seatback 2 from the state in which the kick pin 22B is riding on the outer peripheral surface 11B1 of the push portion 11B of the operating link 11, the operating link 11 may not easily return to its original position due to resistance from the pressing force in the radially inward direction from the kick pin 22B.

However, as shown in FIG. 13, when the seatback 2 is raised toward the rear from the forward tilting position as well, the operating link 11 is forcibly pushed back by the front portion 12B of the bracket 12 from the raising of the seatback 2. Therefore, the operating link 11 is able to be smoothly returned to its original rotational position together with the seatback 2, even when it receives resistance from the pressing force of the kick pin 22B.

When the seatback 2 is tilted farther forward (i.e., folded down) from the forward-tilting position (the position shown in FIG. 10) of the walk-in operation by a fold-down operation, the kick pin 22B of the intermediate link 22 rides forward off of (i.e., past) the outer peripheral surface 11B1 of the push portion 11B of the operating link 11 following this movement, and separates from the push portion 11B (i.e., disengages from the push portion 11B), as shown in FIG. 11. Accordingly, the intermediate link 22 and the output link 21 that had been pushed around together with the intermediate link 22 return to their initial positions before being rotated, such that the cable 26 is no longer being pulled on. As a result, the slide device 6 (see FIG. 6) again returns to the slide-locked state.

Figure 12:
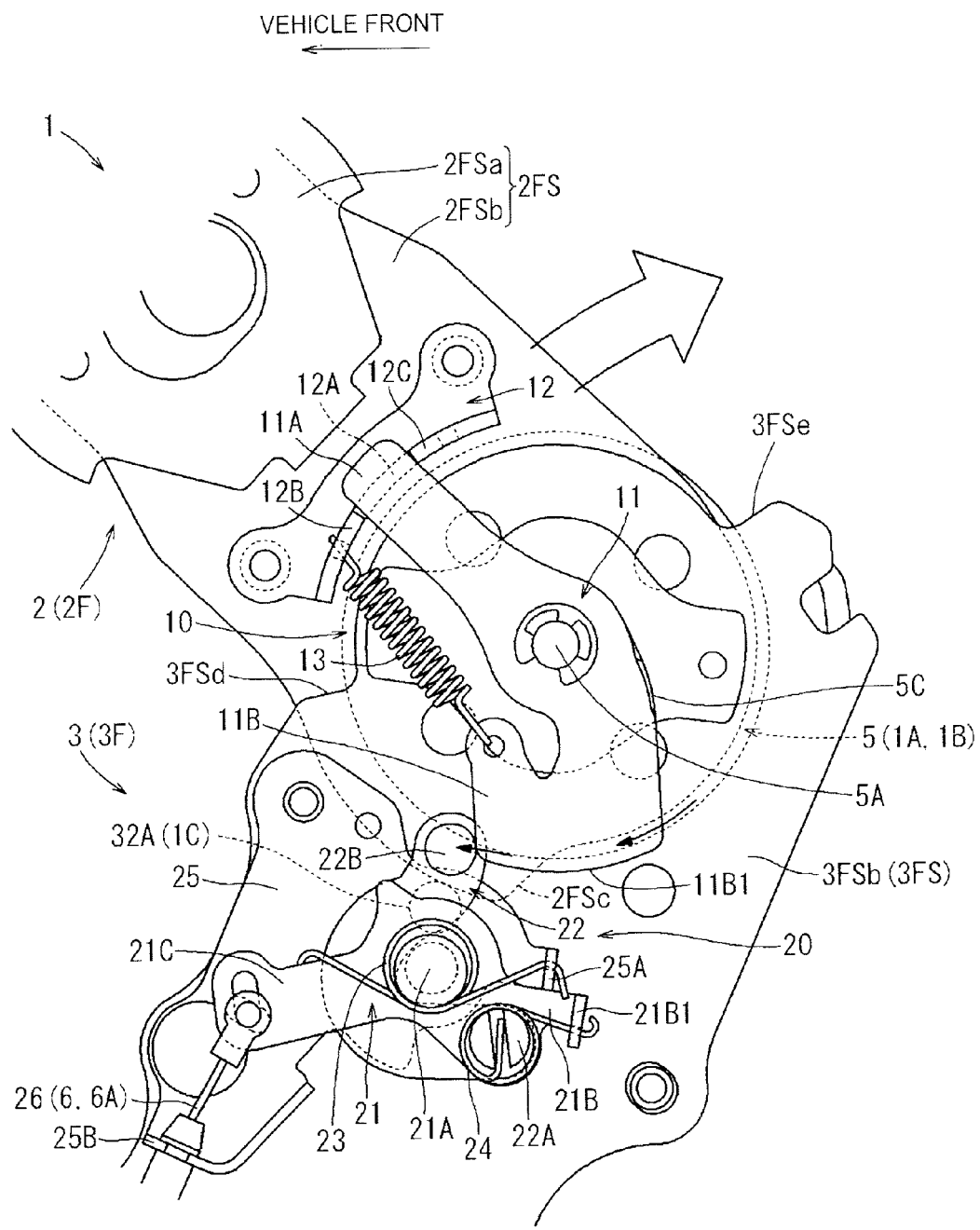
FIG. 12 is an enlarged view of the main portions when the seatback is in the middle of being raised from the folded down position.

If the kick pin 22B of the intermediate link 22 ends up riding forward off of (i.e., past) the push portion 11B of the operating link 11 in this way, the front-rear positional relationship of the two ends up reversing, and when the seatback 2 is raised, the push portion 11B of the operating link 11 will end up pushing the kick pin 22B of the intermediate link 22 from the direction opposite that described above (i.e., from the rear). However, in this case, as shown in FIG. 12, the intermediate link 22 is pushed around in the counterclockwise direction in the drawing independently with respect to the output link 21, with the connecting shaft 22A as the fulcrum, against the urging force of the pressing spring 24, so the movement described above is relieved by the intermediate link 22 rotating idly. This relieving operation ensures that the operation of raising the seatback 2 to the rear from the folded down position will not be impeded. When the seatback 2 is raised from the folded down position, the kick pin 22B of the intermediate link 22 rides rearward off of (i.e., past) the outer peripheral surface 11B1 of the push portion 11B of the operating link 11, and separates from the push portion 11B (i.e., disengages from the push portion 11B). As a result, the intermediate link 22 returns to its original position before rotating idly, as shown in FIG. 8.

As described above, when the seatback 2 is returned to the raised angle/position from the folded down position as well, the operating link 11 is forcibly pushed around by the front portion 12B of the bracket 12 from the raising of the seatback 2. Therefore, the operating link 11 is able to be smoothly pushed back to a predetermined raised rotational position by rotating together with the seatback 2, even when it receives resistance when pushing the kick pin 22B of the intermediate link 22 from the rear.

Continuing on, the structure of a stopper mechanism 30 that stops forward-tilting rotation of the seatback 2 at the forward tilting position when the walk-in operation is performed on the seatback 2, illustrated in FIG. 10, will be described. The stopper mechanism 30 is provided on a side surface portion on the inside of the side frame 3FS on the vehicle inside of the seat cushion 3, as shown in FIG. 6. Here, the seat cushion 3 (i.e., the side frame 3FS) is one example of the "base" of the invention. The stopper mechanism 30 is a structure that stops the tilting rotation of the seatback 2 at the forward tilting position by abutting a stopping portion 2FSc (which is one example of the "stopping portion" of the invention) formed protruding in a horn-shape on a front lower edge portion of the thick plate part 2FSb of the side frame 2FS of the seatback 2 against a receiving pin 32A that will be described later, when the seatback 2 is tilted (rotated) forward by an operation of the W/I lever 1A or the cushion lever 1B, as shown in FIG. 10.

Also, when the user operates the F/D lever 1C, the stopper mechanism 30 consequently retracts the receiving pin 32A downward, which releases the stopped state of the seatback 2 from the forward tilting position, thus enabling the seatback 2 to be folded down far forward to the folded down position, as shown in FIG. 11.

Figure 14:
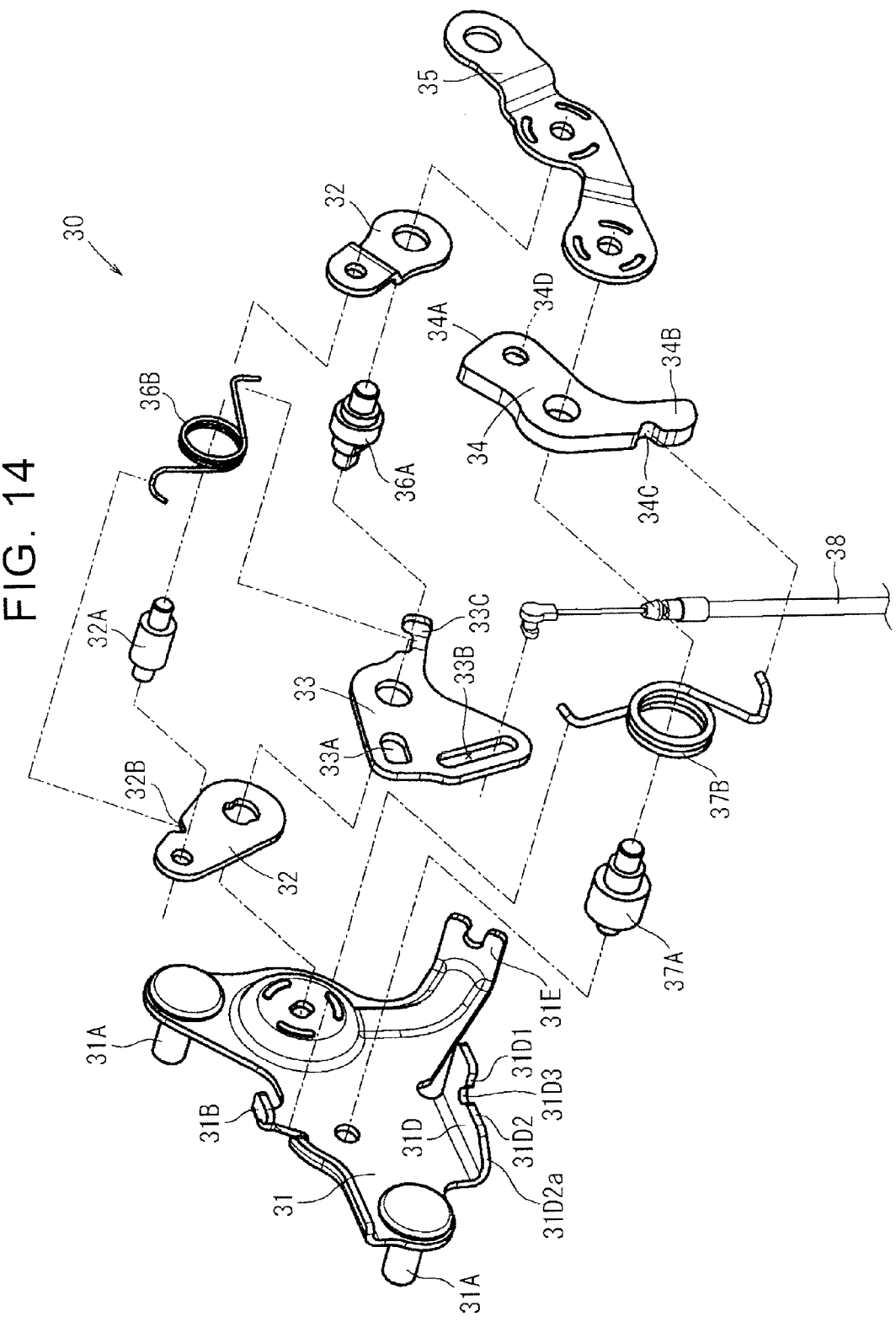
FIG. 14 is an exploded perspective view of a stopper mechanism.

Hereinafter, the specific structure of the stopper mechanism 30 will be described in detail. As shown in FIG. 14, the stopper mechanism 30 includes a base plate 31, a receiving link 32, an operating link 33, a stopper link 34, a retainer plate 35, a first rotating shaft 36A, a second rotating shaft 37A, a first urging spring 36B, a second urging spring 37B, and a release cable 38. Here, the structure formed by the receiving link 32 and the stopper link 34 is one example of the "stopper" of the invention. The base plate 31 is fixed by being integrally fastened to a side surface portion on the inside of the side frame 3FS on the vehicle inside of the seat cushion 3 by two fastening pins 31A. A spring catch portion 31B, and a stopping piece 31D and a cable catch portion 31E, that are formed bend in the plate thickness direction, are formed on upper and lower edge portions, respectively, of the base plate 31 in the drawing. Here, the stopping piece 31D is one example of the "deformation inhibiting member" of the invention.

The spring catch portion 31B is a portion formed to be hooked onto by one end of the second urging spring 37B (a torsion spring). Also, the cable catch portion 31E is a portion formed to be hooked onto by an end portion of an outer tubular member of the release cable 38 that has a double layered cable structure and that is connected to the F/D lever 1C. The stopping piece 31D is formed having a stopping surface 31D1 that stops rotation of the stopper link 34 by abutting against a leg portion 34B of the stopper link 34 that will be described later in the direction of rotation, a deformation inhibiting surface 31D2 that is placed against the leg portion 34B of the stopper link 34 in the axial direction (i.e., the seat width direction) and inhibits deforming movement in the axial direction of the stopper link 34 when the leg portion 34B abuts against the stopping surface 31D1, and a groove 31D3 that is formed recessed at a corner portion of the stopping surface 31D1 and the deformation inhibiting surface 31D2. The groove 31D3 is formed recessed from the corner portion at the boundary between the stopping surface 31D1 and the deformation inhibiting surface 31D2, such that the leg portion 34B of the stopper link 34 that will be described later is able to surface-abut with both the stopping surface 31D1 and the deformation inhibiting surface 31D2 at the same time.

Figure 15:
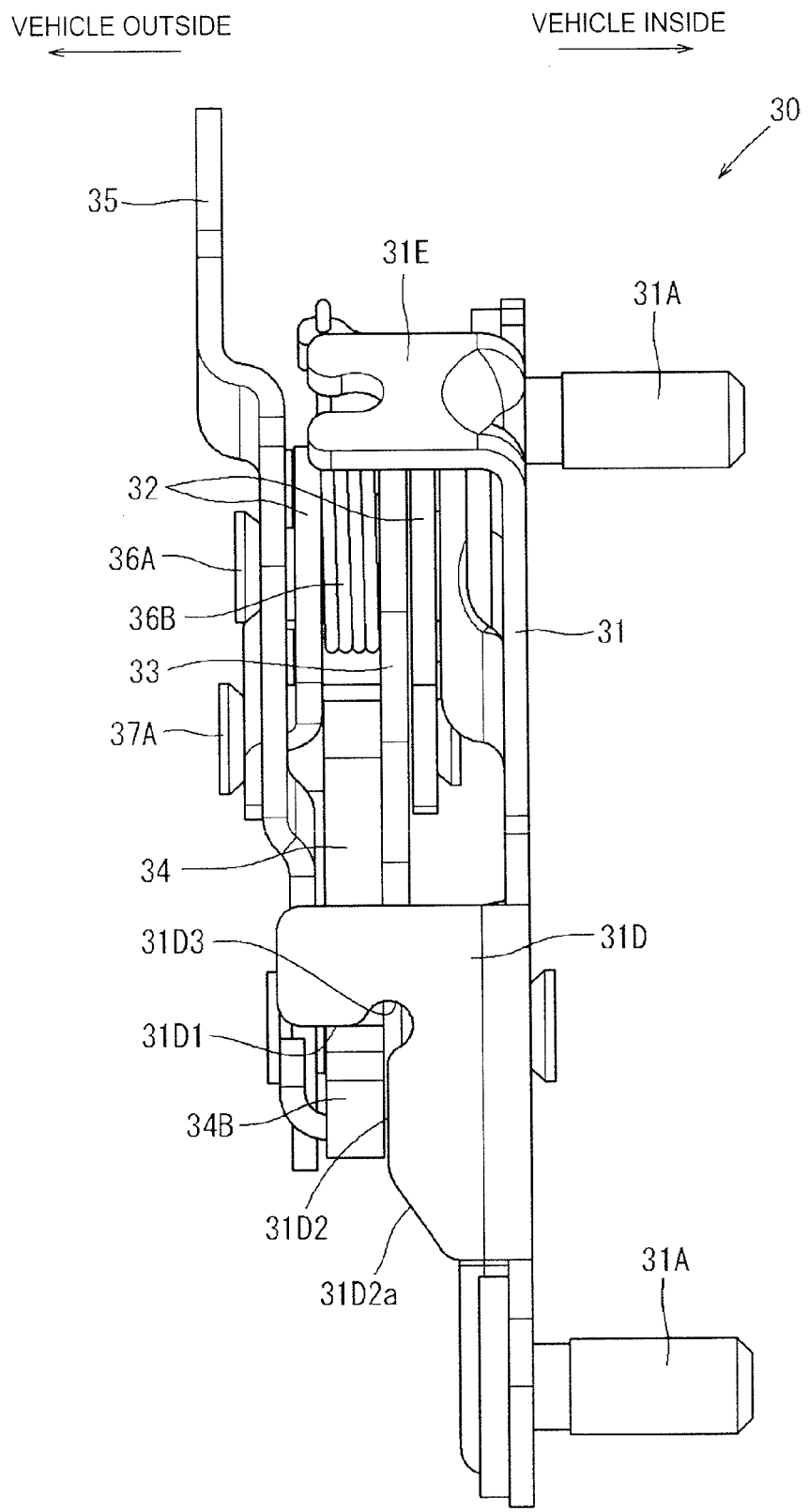
FIG. 15 is a bottom view of the stopper mechanism.

Also, a guide surface 31D2*a* having an inclined surface shape that serves to relieve interference with the leg portion 34B of the stopper link 34 in the axial direction so that the leg portion 34B of the stopper link 34 will not bump into anywhere other than the stopping surface 31D1 in the rotational direction when the leg portion 34B of the stopper link 34 rotates to the position where it abuts against the stopping surface 31D1, is formed on the stopping piece 31D. This guide surface 31D2*a* is formed so as to chamfer, at an angle, an edge portion (a corner portion) of a tip end side (seat front side) of the stopping piece 31D that the leg portion 34B of the stopper link 34 first passes by when the leg portion 34B of the stopper link 34 rotates toward the stopping surface 31D1, and is formed as an inclined surface that connects the edge portion surface on the tip end side of the stopping piece 31D with the deformation inhibiting surface 31D2 at an angle, as shown in FIGS. 14 and 15.

By setting the guide surface 31D2*a*, when the leg portion 34B of the stopper link 34 rotates in the direction in which it abuts against the stopping surface 31D1, even if the position where the leg portion 34B of the stopper link 34 bumps into the edge portion on the tip end side of the stopping piece 31D in the rotational direction changes due to variation in the assembly position in the axial direction (the seat width direction) between the stopper link 34 and the stopping piece 31D, the leg portion 34B of the stopper link 34 will abut against the guide surface 31D2a, and be guided to move in the axial direction toward the side where the deformation inhibiting surface 31D2 is formed, so as to ride along the deformation inhibiting surface 31D2 and bump into the stopping surface 31D1 in the rotational direction. Therefore, because of the guide surface 31D2a, even if the stopper link 34 and the stopping piece 31D are provided close together in the axial direction, the deformation inhibiting surface 31D2 is able to be placed next to the leg portion 34B of the stopper link 34, while the leg portion 34B of the stopper link 34 appropriately abuts against the stopping surface 31D1.

As shown in FIG. 14, the receiving link 32 is formed by a pair of link members that are lined up in the axial direction. A round bar-shaped receiving pin 32A extends between the tip end portions of the link members and is integrally joined thereto. An end portion on the base side of each link member is provided rotatably shaft-connected to the base plate 31 by a first rotating shaft 36A. As a result, the receiving link 32 is provided so as to be able to move the receiving pin 32A that is attached to the tip end portion thereof upward, as well as retract the receiving pin 32A downward, by rotating with respect to the base plate 31. A recessed spring catch groove 32B onto which one end of a first urging spring 36B (a torsion spring) that will be described later is hooked is formed on a side portion of a link member on one side of the receiving link 32.

The operating link 33 is formed by a flat plate-shaped member. A horizontally long recessed portion 33A and a vertically long long hole 33B are formed in a plate portion of this operating link 33. In addition, a spring catch portion 33C that is bent in the direction of plate thickness is formed on an edge portion, on the right side in the drawing, of the operating link 33. This operating link 33 is shaft-connected in a state able to rotate, together with the receiving link 32, coaxially around the base plate 31. By this connection, the operating link 33 and the receiving link 32 are provided so as to both be able to relatively rotate individually with respect to the base plate 31. The spring catch portion 33C is a portion formed to hook the other end of the first urging spring 36B (a tension spring) onto.

The stopper link 34 is formed by a steel plate member that is thicker than the link members of the receiving link 32. This stopper link 34 is formed in an L-shaped link shape having a receiving surface 34A that receives the rotation of the receiving link 32 by abutting against the receiving pin 32A, and a leg portion 34B that is restricted from rotatably moving in the retracting direction (i.e., downward) by abutting against the stopping surface 31D1 formed on the base plate 31. The stopper link 34 is provided with a middle portion of the L-shape thereof rotatably shaft-connected to the base plate 31 by the second rotating shaft 37A. As a result, the stopper link 34 is provided such that the leg portion 34B abuts against the stopping surface 31D1 of the base plate 31, thus placing the receiving surface 34A in a state facing upward abutting against the receiving pin 32A of the receiving link 32, or placing the receiving surface 34A in a state retracted downward not abutting against the receiving pin 32A, depending on the rotational movement of the stopper link 34 with respect to the base plate 31.

A recessed spring catch groove 34C that one end of the second urging spring 37B (a torsion spring) that will be described later hooks onto is provided on a side portion of the leg portion 34B of the stopper link 34. Also, a protruding portion 34D that protrudes in a round pin shape that is assembled in the horizontally long recessed portion 33A formed in the operating link 33, is formed pushed out in the direction of plate thickness by half blanking on the plate portion of the stopper link 34. The stopper link 34 is assembled in a state engaged in the horizontally long recessed portion 33A formed in the operating link 33. As a result, the operating link 33 rotatably operates the receiving surface 34A in a direction in which the receiving surface 34A retracts downward, in conjunction with movement in which the operating link 33 is rotatably operated by being pulled by the release cable 38, as will be described later with reference to FIG. 19.

The retainer plate 35 is provided extending between the first rotating shaft 36A and the second rotating shaft 37A, and integrally joined to these. This retainer plate 35 suppresses strong inter-shaft repulsion force from being applied between the first rotating shaft 36A and the second rotating shaft 37A when the load of the seatback 2 is applied to the stopper mechanism 30. The retainer plate 35 also prevents the parts assembled between it and the base plate 31 from slipping off in the axial direction.

As shown in FIGS. 14 and 15, the first rotating shaft 36A is formed in a stepped shape, with one end on the left side in FIG. 14 integrally joined to the base plate 31, and the other end on the right side in FIG. 14 integrally joined to the retainer plate 35. As a result, the first rotating shaft 36A is assembled in a state in which the operating link 33, the ring member on one side of the receiving link 32, and the link member on the other side of the receiving link 32 are positioned in the axial direction, with the operating link 33 and the ring member on one side of the receiving link 32 being sandwiched in a rotatable state between the bulge-shaped portion in the center in the axial direction of the first rotating shaft 36A and the base plate 31, and with the link member on the other side of the receiving link 32 being sandwiched in a rotatable state between the portion of the first rotating shaft 36A bulge-shaped center and the retainer plate 35.

The second rotating shaft 37A is also formed in a stepped shape, with one end on the left side in the drawing integrally joined to the base plate 31, and the other end on the right side in the drawing integrally joined to the retainer plate 35. As a result, the second rotating shaft 37A is assembled in a state in which the stopper link 34 is positioned in the axial direction, with the stopper link 34 being sandwiched in a rotatable state between the bulge-shaped portion in the center in the axial direction of the second rotating shaft 37A and the retainer plate 35.

As shown in FIG. 14, the first urging spring 36B (a torsion spring) is arranged with the wound portion in the center thereof being wound around the first rotating shaft 36A, one end being hooked onto the spring catch groove 32B formed in the receiving link 32, and the other end being hooked onto the spring catch portion 33C formed in the operating link 33. As a result, the first urging spring 36B is provided so as to constantly rotatably urge the receiving link 32 in the counterclockwise direction in the drawing, i.e., in a direction that retractably moves the receiving pin 32A downward (in a direction that pushes the receiving pin 32A against the receiving surface 34A of the stopper link 34), with respect to the operating link 33, as shown in FIG. 16.

The second urging spring 37B (a torsion spring) is arranged with the wound portion in the center thereof being wound around the second rotating shaft 37A, one end being hooked onto the spring catch portion 31B formed on the base plate 31, and the other end being hooked onto the spring catch groove 34C formed in the stopper link 34, as shown in FIG. 14. As a result, as shown in FIG. 16, the second urging spring 37B is provided constantly rotatably urging the stopper link 34 in the counterclockwise direction in the drawing with respect to the base plate 31, and pushes the leg portion 34B of the stopper link 34 against the stopping surface 31D1 formed on the base plate 31, thus engaging the leg portion 34B of the stopper link 34 with the stopping surface 31D1 formed on the base plate 31. The second urging spring 37B is formed in a thicker, larger line shape than the first urging spring 36B, and is able to display stronger spring force.

Figure 19:
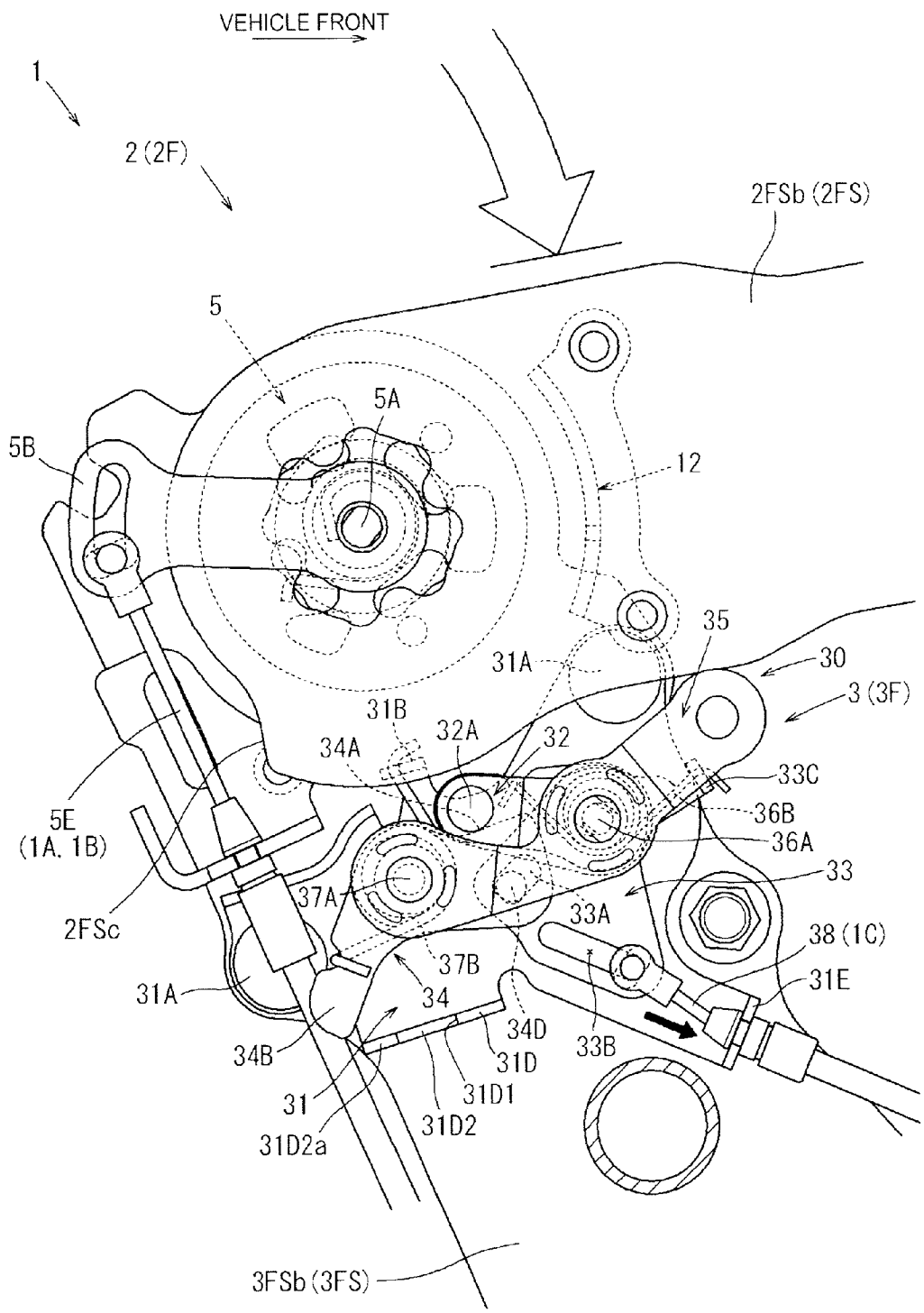
FIG. 19 is a side view of the stopper mechanism when it has been released from the state in which the seatback is tilted to the forward tilting position.

Therefore, the stopper link 34 is constantly maintained in a state receiving the receiving pin 32A of the receiving link 32 by the receiving surface 34A that faces upward angled toward the front, with the leg portion 34B of the stopper link 34 being pushed against the stopping surface 31D1 of the base plate 31 by the urging force of the second urging spring 37B. Also, when the release cable 38 that will be described later is operated, the stopper link 34 is rotatably operated in a direction that pushes the receiving surface 34A downward against the urging force of the second urging spring 37B, as shown in FIG. 19, so even after the receiving pin 32A of the receiving link 32 that receives the urging force of the first urging spring 36B is pushed against the upper surface of the stopper link 34, the urging force of the second urging spring 37B that displays a stronger urging force than the first urging spring 36B causes the stopper link 34 to rotate in a manner that pushes the receiving pin 32A back upward. As a result, the stopper link 34 returns to its initial position (i.e., the position in which the leg portion 34B abuts against the stopping surface 31D1 of the base plate 31) in which the receiving surface 34A faces upward angled toward the front, as shown in FIG. 16.

Also, while the stopper link 34 is held in the initial position by the urging force of the second urging spring 37B, the receiving pin 32A of the receiving link 32 that receives the urging force of the first urging spring 36B is pushed against the receiving surface 34A of the stopper link 34. At this time, the receiving surface 34A is formed in a shape curved in an arc centered around the second rotating shaft 37A that is the rotational center of the stopper link 34. While the stopper link 34 is held in the initial position described above, pressing force received from the receiving pin 32A of the receiving link 32 is transmitted directly toward the second rotating shaft 37A, such that the receiving surface 34A firmly receives the load received from the receiving pin 32A at a fixed position, without receiving a load that would move it in the rotational direction.

As shown in FIG. 14, the release cable 38 is a double layered cable structure in which a linear wire member is inserted through the inside of a flexible tubular member. With the release cable 38, an upper end portion of the tubular member in the drawing is fixed by being hooked onto the cable catch portion 31E formed on the base plate 31. The upper end portion of the wire member that runs out from the upper end portion of this tubular member is hooked in a slidable state inside the long hole 33B of the operating link 33. Also, the other end portion of the release cable 38 on the side not shown in the drawing is connected to the F/D lever 1C illustrated in FIG. 1. Therefore, as shown in FIG. 19, when the F/D lever 1C is operated, the release cable 38 is consequently pulled on in a manner in which the upper end portion of the wire member that is shown is drawn into the tubular member. As a result, the operating link 33, rotates counterclockwise in the drawing around the first rotating shaft 36A. This rotation of the operating link 33 causes the stopper link 34, in which the protruding portion 34D is engaged in the recessed portion 33A of the operating link 33 to then rotate in the clockwise direction in the drawing around the second rotating shaft 37A, and thus retract.

As shown in FIG. 16, when the seatback 2 is at an upright angle/position in which it is normally used as a backrest, the stopper mechanism 30 having this structure is maintained in a state in which the leg portion 34B of the stopper link 34 is pushed against and stopped by the stopping surface 31D1 of the base plate 31 by the urging force of the second urging spring 37B, and the receiving pin 32A of the receiving link 32 is pushed against and stopped by the receiving surface 34A of the stopper link 34 by the urging force of the first urging spring 36B.

Figure 17:
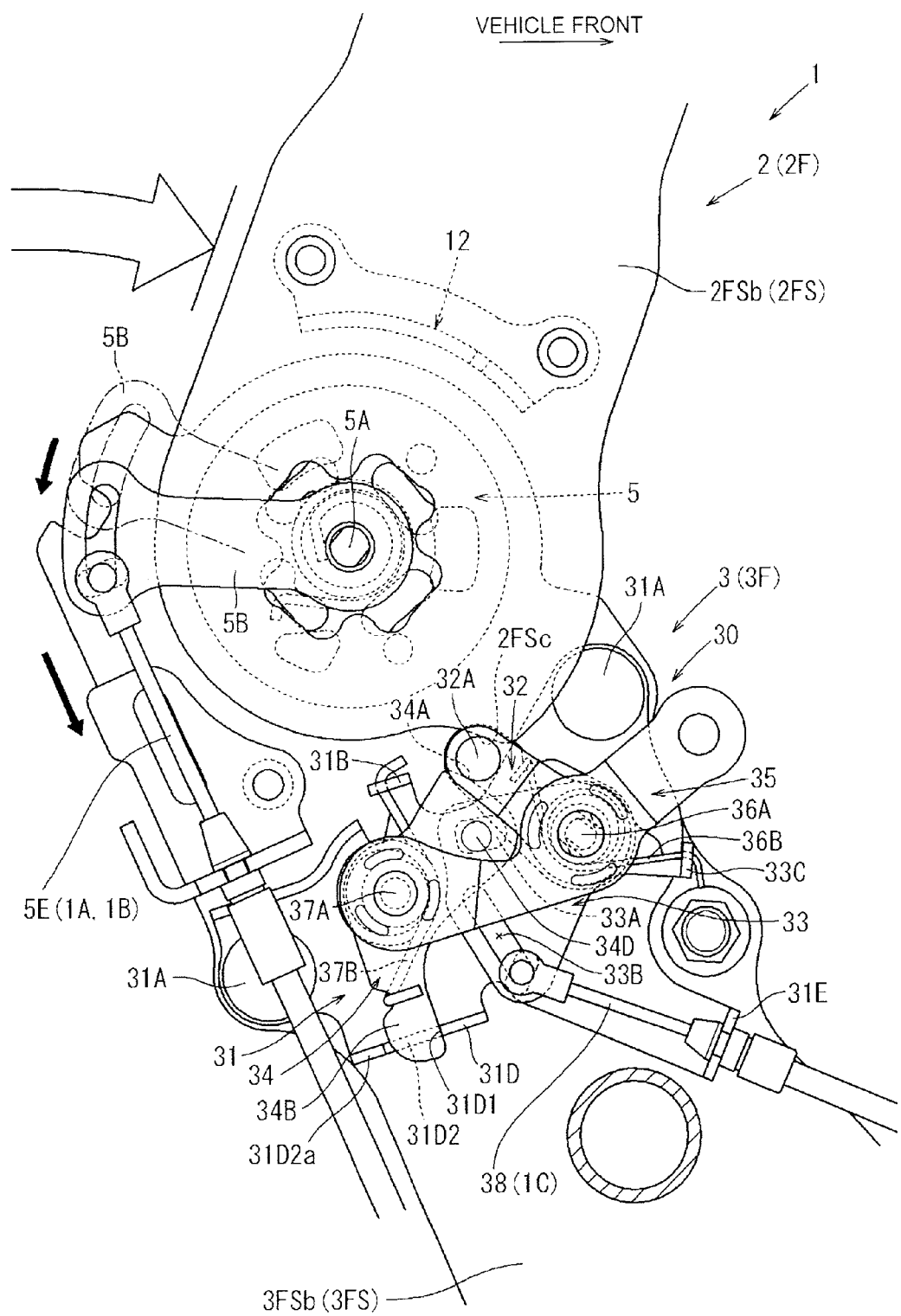
FIG. 17 is a side view of the stopper mechanism when the seatback has been tilted to the forward tilting position.
Figure 18:
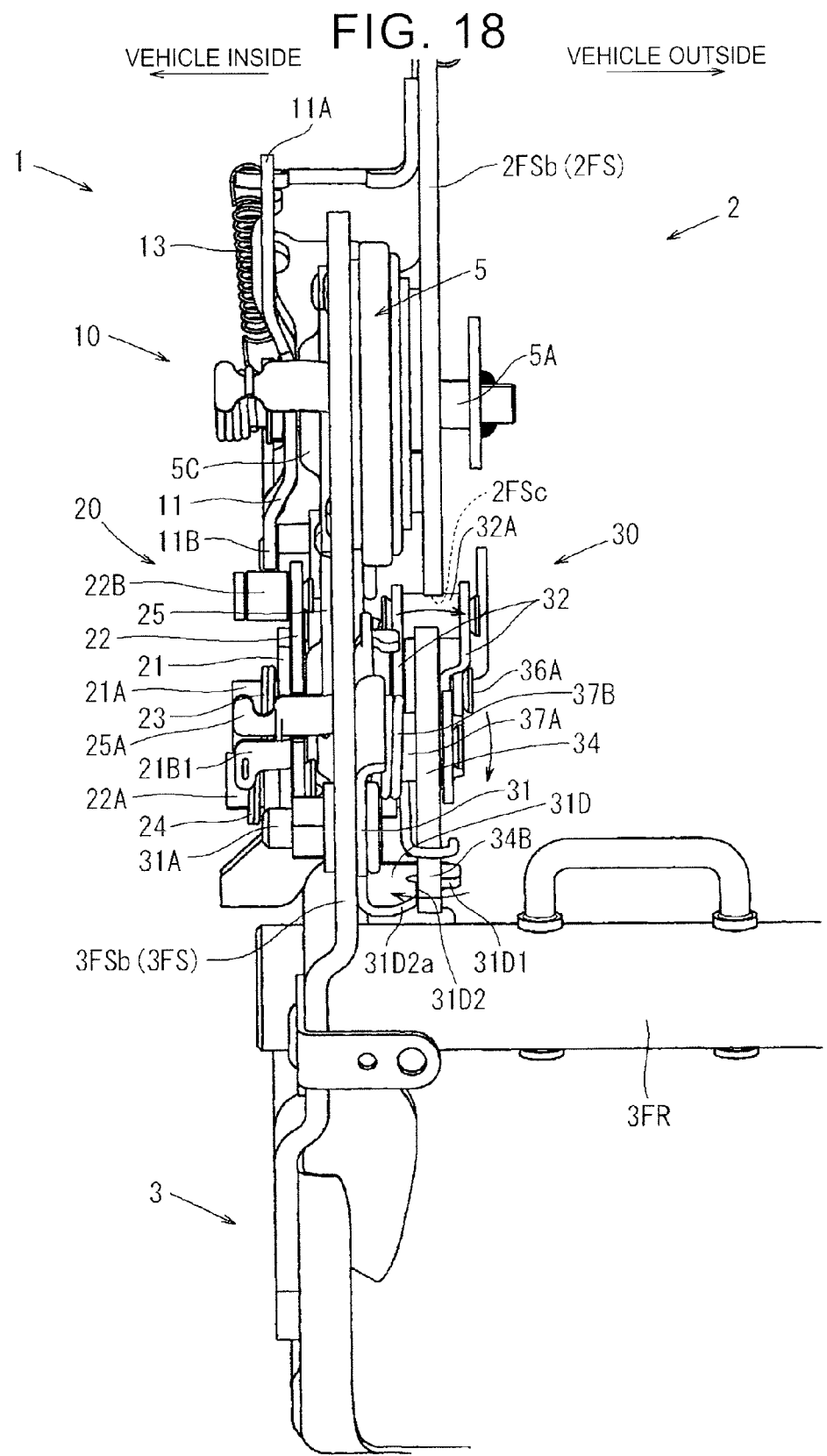
FIG. 18 is a bottom view of the stopper mechanism when the seatback has been tilted to the forward tilting position.

Also, as shown in FIG. 17, when the W/I lever 1A or the cushion lever 1B is operated from the state described above and the seatback 2 is tilted to the forward tilting position, a stopping portion 2FSc formed on the side frame 2FS of the seatback 2 consequently abuts against the receiving pin 32A, and is received by the stopper link 34 that supports the receiving pin 32A. As a result, the forward tilting rotation of the seatback 2 is received and stopped at the forward tilting position. At this time, as shown in FIG. 18, a large load is applied to the stopper link 34 that receives the receiving pin 32A, as a result of receiving a heavy object such as the seatback 2. Specifically, a high load that attempts to push and bend the stopper link 34 in the axial direction (i.e., the seat width direction) with the second rotating shaft 37A, which supports the stopper link 34 in a cantilevered manner with respect to the base plate 31, as the fulcrum, is applied to the stopper link 34. More specifically, the stopper link 34 receives a load in which a section of the stopper link 34 where the receiving surface 34A above the second rotating shaft 37A is formed is pushed and bent so as to be inclined toward the inside of the seat (i.e., the right side in the drawing), with the second rotating shaft 37A as the fulcrum, and a section of the stopper link 34 where the leg portion 34B below the second rotating shaft 37A is formed is pushed and bent so as to be inclined toward the outside of the seat (i.e., the left side in the drawing) closer to the base plate 31, also with the second rotating shaft 37A as the fulcrum.

However, as shown in FIG. 15, the stopper link 34 is in a state in which the leg portion 34B thereof is placed against, and supported from the seat outside by, the deformation inhibiting surface 31D2 of the stopping piece 31D formed on the base plate 31, so the stopper link 34 will not deform in the seat width direction even if it receives the load described above. Therefore, the forward tilting rotation of the seatback 2 is firmly received at a fixed position by the stopper link 34 that is inhibited from deforming.

Also, after the forward tilting rotation of the seatback 2 is stopped in the forward tilting position shown in FIG. 18, the release cable 38 is pulled, such that the operating link 33 is drawn in downward, as shown in FIG. 19, by the user then operating the F/D lever 1C (see FIG. 1). As a result, the stopper link 34 rotates together with the operating link 33 in a manner led by the operating link 33, so the receiving surface 34A is released from having to support the receiving pin 32A. As a result, the receiving link 32 is no longer prevented from rotating by the stopper link 34, so the receiving link 32 is also rotated so as to retract the receiving pin 32A downward by the urging force of the first urging spring 36B. Thus, the seatback 2 is no longer stopped in the forward tilting position, and thus is able to be folded down to the folded down position.

In this way, with the structure of the vehicle seat 1 in this example embodiment, the structural strength of the stopper link 34 is increased by the deformation inhibiting surface 31D2 that minimizes bending deformation of the stopper link 34 in the seat width direction being formed on the base plate 31, so the seatback 2 is able to be appropriately received at a fixed position by the stopper link 34 and the receiving pin 32A of the receiving link 32. The deformation inhibiting surface 31D2 is configured to minimize deformation in which the stopper link 34 is pushed and bent in the seat width direction, by abutting in the seat width direction against the leg portion 34B of the stopper link 34. In this way, the structural strength of the stopper link 34 is able to be effectively increased by a simple structure in which the deformation inhibiting surface 31D2 is placed against the stopper link 34 in the seat width direction.

Also, as described in this example embodiment, even if the stopper link 34 is a movable structure that is able to be placed in a state that does not stop forward tilting rotation of the seatback 2, a structure that increases the structural strength of the stopper link 34 is able to be obtained by a simple structure in which the deformation inhibiting surface 31D2 is provided abutting against the stopper link 34 in the seat width direction. Also, by forming the guide surface 31D2a on the stopping piece 31D of the base plate 31 that will be the deformation inhibiting member, even if the stopping piece 31D and the stopper link 34 are provided close together in the seat width direction (i.e., the axial direction), rotation of the stopper link 34 is able to be inhibited from being stopped by the stopper link 34 bumping into the stopping piece 31D in the rotational direction when the stopper link 34 rotates to the position where it abuts against the stopping surface 31D1 of the base plate 31. Therefore, the stopping piece 31D and the stopper link 34 are brought close together in the seat width direction (i.e., the axial direction), so the structural strength of the stopper link 34 is able to be appropriately increased.

Above, one example embodiment of the invention is described, but the invention may also be carried out in any one of a variety of modes other than the example embodiment described above. For example, the stopping structure of the invention may also be applied so as to stop forward tilting rotation of the seatback in the folded down position, as well as in the forward tilting position described in the above example embodiment. Also, the stopping structure of the invention may also be a structure in which the stopping portion is provided on a base such as a seat cushion, and the stopper may be provided on the seatback.

Also, the stopper of the invention may also be a fixed type stopper structure instead of a retracting type stopper structure. Further, the deformation inhibiting member that minimizes deformation of the stopper in the seat width direction may also be provided on either the stopper or the base. Also, when the stopper is a fixed type stopper, the deformation inhibiting member may be provided in a state extended between, and integrally connected to, the stopper and the base. Also, the guide surface may be a curved surface, as well as a straight inclined surface. Also, the deformation inhibiting member that minimizes deformation in the seat width direction of the stopper and the stopping surface that receives the rotation of the stopper may both be formed separately, or they may be integrally formed as described in the example embodiment above. Moreover, the deformation inhibiting member may be provided so as to stop deformation of any portion of the stopper that is pushed and bent in the seat width direction.

What is claimed is:

1. A vehicle seat comprising a stopping structure that stops forward tilting rotation of a seatback between the seatback and a base on a floor, the stopping structure including:
   a stopping portion provided on one of the seatback and the base;
   a stopper, having a leg portion, that is provided on the other of the seatback and the base and that extends to a position overlapping with the stopping portion in a seat width direction, the stopping structure being configured to stop the forward tilting rotation of the seatback by abutment of the stopping portion and the stopper; and
   a deformation inhibiting member that is fixed to the other of the seatback and the base to prevent rotation of the deformation inhibiting member relative to the other of the seatback and the base, the deformation inhibiting member being configured to minimize deformation in the seat width direction initiated from the abutment of the stopper against the stopping portion following forward tilting rotation of the seatback, the deformation inhibiting member including:
      a stopping surface that extends in the seat width direction and that is configured to stop a forward tilting rotation of the stopper at an engagement position where the stopping surface is brought into surface-abutment with the leg portion of the stopper; and
      a deformation inhibiting surface that extends in a seat front-rear direction that is configured to minimize the deformation of the stopper in the seat width direction by the deformation inhibiting surface being brought into surface-abutment with the leg portion of the stopper upon forward tilting rotation of the seatback, wherein
   the leg portion of the stopper is rotatable in a direction away from the stopping surface and the deformation inhibiting surface so as to disengage the surface-abutment of the leg portion of the stopper with the stopping surface and the deformation inhibiting surface.

2. The vehicle seat according to claim 1, wherein
   the stopping portion is provided on the seatback, and the stopper is provided pivotally connected to the base,
   the stopper is configured to receive the forward tilting rotation of the seatback from the abutment of the stopping portion and to stop the forward tilting rotation of the seatback by the surface-abutment of the stopping surface, and
   the stopper is further configured to be placed in a state that allows the forward tilting rotation of the seatback, by a retraction rotation of the stopper and a release of the surface-abutment with the stopping surface.

3. The vehicle seat according to claim 2, wherein the deformation inhibiting member further includes an inclined guide surface that inhibits interference with a rotation of the stopper in the seat front-rear direction to a position where the stopper surface-abuts against the stopping surface and guides the stopper to the surface-abutment with the deformation inhibiting surface and that relieves interference with the leg portion of the stopper in the seat width direction.

4. The vehicle seat according to claim 1, wherein the deformation inhibiting member further includes a groove provided at a corner portion of the deformation inhibiting member between the stopping surface and the deformation inhibiting surface.

5. The vehicle seat according to claim 1, wherein the deformation inhibiting member is non-rotatably fixed to the other of the seatback and the base.

6. A vehicle seat comprising:
a base;
a seatback rotatably connected to the base;
a recliner connected to the seatback and the base that allows adjustment of an angle defined by the seatback and the base; and
a stopping structure that stops forward tilting rotation of the seatback between the seatback and the base, the stopping structure including:
  a stopping portion provided on one of the seatback and the base;
  a stopper, having a leg portion, that is provided on the other of the seatback and the base and that extends to a position overlapping with the stopping portion in a seat width direction, the stopping structure being configured to stop the forward tilting rotation of the seatback by abutment of the stopping portion and the stopper; and
  a deformation inhibiting member that is non-rotatably fixed to the other of the seatback and the base, the deformation inhibiting member having:
    a stopping surface that extends in the seat width direction and that is configured to stop a forward tilting rotation of the stopper at an engagement position where the stopping surface is brought into surface-abutment with the leg portion of the stopper; and
    a deformation inhibiting surface that extends in a seat front-rear direction that is configured to minimize the deformation of the stopper in the seat width direction by the deformation inhibiting surface being brought into surface-abutment with the leg portion of the stopper upon forward tilting rotation of the seatback, wherein
the leg portion of the stopper is rotatable in a direction away from the stopping surface and the deformation inhibiting surface so as to disengage the surface-abutment of the leg portion of the stopper with the stopping surface and the deformation inhibiting surface, and
when the stopper abuts against the stopping portion following forward tilting rotation of the seatback, the deformation inhibiting member minimizes deformation of the stopper in the seat width direction.

7. The vehicle seat according to claim 6, wherein
the stopping portion is provided on the seatback, and the stopper is pivotally connected to the base,
the stopper is configured to receive the forward tilting rotation of the seatback from the abutment of the stopping portion and to stop the forward tilting rotation of the seatback by the surface-abutment of the stopping surface, and
the stopper is further configured to be placed in a state that allows the forward tilting rotation of the seatback, by a retraction rotation of the stopper and a release of the surface-abutment with the stopping surface.

8. The vehicle seat according to claim 7, wherein the deformation inhibiting member further includes an inclined guide surface that inhibits interference with a rotation of the stopper in the seat front-rear direction to a position where the stopper surface-abuts against the stopping surface and guides the stopper to the surface-abutment with the deformation inhibiting surface and that relieves interference with the leg portion of the stopper in the seat width direction.

9. The vehicle seat according to claim 6, wherein the deformation inhibiting member further includes a groove provided at a corner portion of the deformation inhibiting member between the stopping surface and the deformation inhibiting surface.

* * * * *